(12) United States Patent
Takata et al.

(10) Patent No.: US 9,094,065 B2
(45) Date of Patent: Jul. 28, 2015

(54) TRANSMISSION DEVICE AND TRANSMISSION METHOD

(71) Applicant: Panasonic Intellectual Property Corporation of America, Torrance, CA (US)

(72) Inventors: Tomofumi Takata, Ishikawa (JP); Akihiko Nishio, Osaka (JP); Daichi Imamura, Beijing (CN); Takashi Iwai, Ishikawa (JP); Atsushi Matsumoto, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/372,440

(22) PCT Filed: Jan. 11, 2013

(86) PCT No.: PCT/JP2013/000074
§ 371 (c)(1),
(2) Date: Jul. 15, 2014

(87) PCT Pub. No.: WO2013/111523
PCT Pub. Date: Aug. 1, 2013

(65) Prior Publication Data
US 2014/0355710 A1    Dec. 4, 2014

(30) Foreign Application Priority Data

Jan. 27, 2012    (JP) .................................. 2012-015617

(51) Int. Cl.
*H04B 7/04*    (2006.01)
*H04B 7/02*    (2006.01)
(Continued)

(52) U.S. Cl.
CPC .............. *H04B 7/0417* (2013.01); *H04B 7/024* (2013.01); *H04B 7/0452* (2013.01); *H04L 5/0035* (2013.01); *H04L 5/0051* (2013.01); *H04L 27/2613* (2013.01)

(58) Field of Classification Search
CPC .... H04B 7/0417; H04B 7/0452; H04B 7/024; H04B 7/026; H04J 11/0053; H04J 13/16; H04L 27/2613; H04L 5/0035; H04L 5/0051
See application file for complete search history.

(56) References Cited

U.S. PATENT DOCUMENTS 8,995,410 B2 * 3/2015 Balan et al. ................... 370/336
2010/0173642 A1    7/2010 Iwai et al.
(Continued)

FOREIGN PATENT DOCUMENTS

| JP | 4624475 B2 | 2/2011 |
| WO | 2010/120140 A2 | 10/2010 |
| WO | 2011/007583 A1 | 1/2011 |

OTHER PUBLICATIONS

3GPP TS 36.211 V10.2.0, "3rd Generation Partnership Project; Technical Specification Group Radio Access Network; Evolved Universal Terrestrial Radio Access (E-UTRA); Physical Channels and Modulation (Release 10)," Jun. 2011, 103 pages.

(Continued)

*Primary Examiner* — Hirdepal Singh
(74) *Attorney, Agent, or Firm* — Seed IP Law Group PLLC

(57) ABSTRACT

Provided is a transmission device with which, by orthogonalizing different transmission bandwidth DM-RSs, CoMP performance is improved, and it is possible to increase MU-MIMO communication multiplexing. In the device, a sequence generator unit (103) generates a reference signal of a number of transmission bandwidths which is less than a prescribed number using a first sequence which is used in a reference signal of a number of transmission bandwidths which is greater than or equal to the prescribed number when a coordinated receiving by a plurality of receiving devices is applied, and generates the reference signal of the number of transmission bandwidth which is less than the prescribed number using a second sequence which differs from the first sequence when the coordinated receiving is not applied. A transmission unit (112) transmits the reference signal.

10 Claims, 25 Drawing Sheets

(51) Int. Cl.
*H04L 5/00* (2006.01)
*H04L 27/26* (2006.01)

(56) References Cited

U.S. PATENT DOCUMENTS

| | | | |
|---|---|---|---|
| 2013/0077569 A1* | 3/2013 | Nam et al. | 370/328 |
| 2013/0114514 A1* | 5/2013 | Nissila et al. | 370/329 |
| 2013/0242951 A1* | 9/2013 | Lee et al. | 370/336 |
| 2014/0126479 A1* | 5/2014 | Iwai et al. | 370/328 |
| 2014/0192756 A1* | 7/2014 | Baldemair et al. | 370/329 |
| 2014/0314031 A1* | 10/2014 | Kim et al. | 370/329 |
| 2014/0321406 A1* | 10/2014 | Marinier et al. | 370/329 |
| 2014/0355545 A1* | 12/2014 | Chung et al. | 370/329 |

OTHER PUBLICATIONS

International Search Report dated Feb. 5, 2013, for corresponding International Application No. PCT/JP2013/000074, 4 pages.

Iwai et al., "Development of reference signal sequence grouping method," IEICE, 2009, 29-34, 6 pages.

Panasonic, NTT DoCoMo, "Frequency dependent PUSCH DM-RS generation method with considering eNB-specific allocation," R1-080581, Agenda Item: 6.1.2, 3GPP TSG RAN WG1 Meeting #51bis, Sevilla, Spain, Jan. 14-18, 2008, 10 pages.

Panasonic, "DMRS enhancement for UL CoMP," R1-113810, Agenda Item: 7.5.4.1 Uplink reference signals, 3GPP TSG-RAN WG1 Meeting #67, San Francisco, USA, Nov. 14-18, 2011, 6 pages.

\* cited by examiner

| $u$ | $\varphi(0),...,\varphi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

FIG. 3

| u | φ(0),...,φ(23) | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | -1 | -1 | -3 | 1 | 1 | -3 | 1 | 3 | -3 | 1 | 1 | -3 | -3 | -1 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

FIG. 4

| u | Group No | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| 1RB | 1 | 1 | 1 | 1 | 2 | 2 | 2 | 3 | 3 | 4 | 4 | 4 | 5 | 5 | 5 | 6 | 6 | 6 | 7 | 7 | 7 | 8 | 8 | 9 | 9 | 9 | 10 | 10 | 10 | 10 |
| 2RB | 1 | 2 | 3 | 4 | 4 | 5 | 6 | 7 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| 3RB | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | | |
| ... | | | | | | | | | | | | | | | | | | | | | | | | | | | | | | |

FIG. 13

| u | \multicolumn{30}{c}{Group No} |
|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| 1RB | 1 | 1 | 1 | 2 | 2 | 2 | 3 | 3 | 3 | 4 | 4 | 4 | 5 | 5 | 5 | 6 | 6 | 6 | 7 | 7 | 7 | 8 | 8 | 8 | 9 | 9 | 9 | 10 | 10 | 10 |
| 2RB | 1 | 2 | 3 | 4 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| 3RB | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| . . | | | | | | | | | | | | | | | | | | | | | | | | | | | | | | |

| n | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|----|----|----|----|----|----|----|----|----|----|----|----|----|----|----|----|----|----|----|----|
| Group No |  |  |  |  |  |  |  |  |  |  |  |  |  |  |  |  |  |  |  |  |  |  |  |  |  |  |  |  |  |  |
| 1RB | — | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| 2RB | 1 | 1 | 1 | 1 | 2 | 2 | 2 | 3 | 3 | 3 | 4 | 4 | 4 | 5 | 5 | 6 | 6 | 6 | 7 | 7 | 8 | 8 | 8 | 9 | 9 | 9 | 10 | 10 | 10 | 10 |
| 3RB | 1 | 1 | 2 | 3 | 4 | 4 | 5 | 6 | 7 | 7 | 8 | 9 | 9 | 10 | 11 | 12 | 13 | 13 | 14 | 15 | 16 | 16 | 17 | 18 | 19 | 19 | 20 | 21 | 22 | 23 |
| ... | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |

| u | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|----|----|----|----|----|----|----|----|----|----|----|----|----|----|----|----|----|----|----|----|
| 1RB | 1 | 1 | 1 | 1 | 2 | 2 | 2 | 3 | 3 | 4 | 4 | 4 | 5 | 5 | 5 | 6 | 6 | 6 | 7 | 7 | 7 | 8 | 8 | 9 | 9 | 9 | 10 | 10 | 10 | 10 |
| 2RB | 1 | 1 | 2 | 3 | 4 | 4 | 5 | 6 | 7 | 7 | 8 | 9 | 10 | 10 | 11 | 12 | 13 | 13 | 14 | 15 | 16 | 16 | 17 | 18 | 19 | 19 | 20 | 21 | 22 | 22 |
| 3RB | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |

FIG. 18

| u | Group No | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| 1RB | 1 | 1 | 2 | 2 | 3 | 3 | 3 | 4 | 4 | 5 | 5 | 5 | 6 | 6 | 7 | 7 | 8 | 8 | 9 | 9 | 10 | 10 | 11 | 11 | 12 | 12 | 12 | 12 | 12 |
| 2RB | 1 | 2 | 3 | 4 | 5 | 6 | 7 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| 3RB | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| . | | | | | | | | | | | | | | | | | | | | | | | | | | | | | | |

FIG. 20

| u | Group No | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| 1RB | 1 | 1 | 2 | 2 | 2 | 3 | 3 | 3 | 4 | 4 | 4 | 5 | 5 | 6 | 6 | 7 | 7 | 8 | 8 | 9 | 9 | 9 | 10 | 10 | 10 | 11 | 11 | 12 | 12 | 12 |
| 2RB | 1 | 2 | 3 | 4 | 5 | 6 | 7 | 7 | 8 | 9 | 10 | 11 | 12 | 13 | 14 | 15 | 16 | 17 | 18 | 19 | 20 | 21 | 22 | 22 | 23 | 24 | 25 | 26 | 27 | 28 |
| 3RB | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| .. | | | | | | | | | | | | | | | | | | | | | | | | | | | | | | |

FIG. 21

| u | Group No | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| 1RB | 1 | 1 | 2 | 2 | 2 | 3 | 3 | 3 | 4 | 4 | 5 | 5 | 5 | 6 | 6 | 7 | 7 | 8 | 8 | 8 | 9 | 9 | 10 | 10 | 10 | 11 | 11 | 12 | 12 | 12 |
| 2RB | 1 | 2 | 3 | 4 | 5 | 6 | 7 | 7 | 8 | 9 | 10 | 11 | 12 | 13 | 14 | 15 | 16 | 17 | 18 | 19 | 20 | 21 | 22 | 22 | 23 | 24 | 25 | 26 | 27 | 28 |
| 3RB | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| . | | | | | | | | | | | | | | | | | | | | | | | | | | | | | | |

FIG. 22

TRANSMISSION DEVICE AND TRANSMISSION METHOD

TECHNICAL FIELD

The present invention relates to a transmitting apparatus and a transmission method.

BACKGROUND ART

3GPP LTE (3rd Generation Partnership Project Long-term Evolution) has adopted a CG (computer generated) sequence for transmission bandwidths of 1 and 2 RBs and a ZC (Zad-off-Chu) sequence for transmission bandwidths of 3 RBs or more as code sequences used for data demodulation reference signals (DM-RS: demodulation-reference signal) used in uplink.

In an LTE uplink, a large number of sequences are divided into 30 sequence groups in each transmission bandwidth (1 to 110 RBs (resource blocks)) and a transmission bandwidth (more specifically, the number of allocated RBs) is associated with a sequence in each sequence group. Each sequence group is assigned a different number (sequence group number) and each cell is assigned one sequence group as shown in FIG. 1 (cell-specific sequence group assignment). Since each sequence group is configured of sequences having a high cross-correlation among sequences, the probability that sequences with a high cross-correlation may be used among neighboring cells is reduced and interference among neighboring cells is thus reduced. Since a base station (may also be called "eNB") broadcasts a sequence group number to a terminal (may also be called "UE (User Equipment)") in the cell, even when a transmission bandwidth is changed, the terminal can identify a DM-RS code sequence number, which in turn makes it possible to omit signaling of the code sequence number.

The reason that a CG sequence which is different from a ZC sequence is selected in transmission bandwidths of 1 and 2 RBs is that the ZC sequence for transmission bandwidths of 1 and 2 RBs cannot secure 30 (number of sequence groups) sequences. That is, since 30 ZC sequences cannot be secured in transmission bandwidths of 1 and 2 RBs, a reuse factor of sequence (the number of repetitions of a ZC sequence number used as a DM-RS) decreases, so that the same sequence number may be assigned in neighboring cells, thus increasing inter-cell interference. Thus, the CG sequence is adopted in transmission bandwidths of 1 and 2RB.

Since the sequence length of a ZC sequence is a prime number, for a DM-RS code sequence (ZC sequence) of 3 RBs or more, a sequence is used in which the leading portion of the ZC sequence which is smaller than a DM-RS in size is copied (extended) to the rear end portion (e.g., see FIG. 2).

The ZC sequence is a kind of CAZAC (constant amplitude and zero auto-correlation code) sequence and expressed by following equation 1. The number of ZC sequences generated is (ZC sequence length $N_{ZC}^{RS}-1$).

[1]

$$\bar{r}_{u,v}(n) = x_q(n \bmod N_{ZC}^{RS}), 0 \le n < M_{sc}^{RS}$$

$$x_q(m) = e^{-j\frac{\pi q m(m+1)}{N_{ZC}^{RS}}}, 0 \le m \le N_{ZC}^{RS}-1$$

(Equation 1)

ZC sequence number q assigned to each sequence group is calculated by equation 2.

[2]

$$q = \lfloor \bar{q} + \frac{1}{2} \rfloor + v \cdot (-1)^{\lfloor 2\bar{q} \rfloor}$$

$$\bar{q} = N_{ZC}^{RS} \cdot (u+1)/31$$

(Equation 2)

Note that as shown in equation 3, sequence group number u is associated with cell ID($N_{ID}^{cell}$) and sequence group hopping is applied in order to randomize interference between sequence groups.

[3]

$$u = (f_{gh}(n_s) + f_{ss}) \bmod 30$$

(Equation 3)

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases}$$

$$f_{ss}^{PUCCH} = N_{ID}^{cell} \bmod 30$$

$$f_{ss}^{PUSCH} = (f_{ss}^{PUCCH} + \Delta_{ss}) \bmod 30$$

Using equation 2, a combination of sequences whose $q/N_{ZC}^{RS}$ value which is a ratio of ZC sequence number q and ZC sequence length $N_{ZC}^{RS}$ becomes closer to each other is assigned to an identical sequence group. Sequences whose inter-sequence $q/N_{ZC}^{RS}$ becomes closer to each other means sequences with a high cross-correlation. It is thereby possible to reduce the cross-correlation between sequence groups (e.g., see PTL 1).

A CG sequence is expressed, for example, by following equation 4 (e.g., see NPL 1). Note that, φ(n) shown in equation 4 is defined in each sequence group number u for a transmission bandwidth of 1 RB as shown in FIG. 3 and defined in each sequence group number u for a transmission bandwidth of 2 RBs as shown in FIG. 4 (e.g., see NPL 1).

[4]

$$\bar{r}_{u,v}(n) = e^{j\phi(n)\pi/4}, 0 \le n \le M_{sc}^{RS}-1$$

(Equation 4)

In LTE-Advanced which is an evolved version of LTE, studies are being carried out on a heterogeneous network (HetNet) using a plurality of base stations having coverage areas different in size for further capacity improvement. For example, in an operation of HetNet, a picocell (LPN (low power node), also called "small power RRH" (remote radio head)) having small transmission power is disposed within a coverage area of a macrocell (also called "HPN" (high power node)) having large transmission power.

In LTE-Advanced, studies are further being carried out on application of CoMP (coordinated multiple point transmission and reception) which is a communication scheme whereby a plurality of cells (base stations) cooperate to transmit/receive signals to/from a terminal for the purpose of improving throughput of users mainly located on a cell edge in a HetNet environment. For example, in the case of UL (uplink) CoMP, a plurality of cells (base stations) cooperate to receive signals from one terminal, then combine the signals and thereby improve receiving quality. In order to reduce the influence of inter-cell interference, a plurality of cells cooperate to schedule terminals to prevent inter-cell interference from increasing within a CoMP set (group of cells that cooperate to perform transmission/reception).

Studies are being carried out on introduction of MU-MIMO (multiple user-multiple input multiple output) communication of a plurality of terminals to which UL CoMP is applied to obtain more performance improvement effects of the above-described UL CoMP, that is, terminals (hereinafter may also be referred to as "UL CoMP terminals") that cooperate to receive and combine transmission signals. MIMO communication is a technique that provides the transmitting and receiving sides with a plurality of antennas and enables simultaneous spatially multiplexed transmission of different signal sequences at the same frequency. MU-MIMO communication is a technique of carrying out MIMO communication between a plurality of terminals and a base station, and can improve frequency utilization efficiency of a system.

To demultiplex signals from different terminals in MU-MIMO communication, it is necessary to transmit DM-RSs which are orthogonal between the terminals. There are various methods of orthogonalizing DM-RSs such as application of OCC (orthogonal cover code) or use of a ZC sequence with CSs (cyclic shifts) differing among terminals applied (CS-ZC sequence). When OCC is applied, DM-RSs for a maximum of two terminals (UEs) can be orthogonalized. A CS-ZC sequence is a sequence obtained by cyclically shifting a ZC sequence. In the CS-ZC sequence, by setting a greater value than a maximum propagation delay time of a transmission signal of a terminal as an amount of cyclic shift, it is possible to orthogonalize a plurality of CS-ZC sequences obtained by cyclically shifting a ZC sequence of the same sequence number.

However, since DM-RSs are received by a plurality of different cells in UL CoMP, there are cases with the aforementioned cell-specific sequence group assignment, where sequence numbers used vary among terminals for which MU-MIMO communication is introduced, causing a situation where DM-RSs cannot be orthogonalized. For this reason, as shown in FIG. 5, studies are being carried out on introducing, for terminals to which CoMP is applied, a UE-specific sequence (Group#2 in FIG. 5) in which a sequence is indicated to each terminal instead of using a cell-specific sequence (Group#0,#1 in FIG. 5), and orthogonalizing DM-RSs between UL CoMP terminals.

MU-MIMO communication involves a problem in that, when transmission bandwidths vary among multiplexing target terminals, CS-ZC sequences used among the terminals (CS-ZC sequences of different bandwidths) are not orthogonalized.

To solve the problem that CS-ZC sequences of different bandwidths are not orthogonalized, NPL 2 discloses that it is possible to orthogonalize CS-ZC sequences of different transmission bandwidths within an identical sequence group (combination of sequences having close $q/N_{ZC}^{RS}$) by applying, to the ZC sequences, cyclic shift (CS) corresponding to the transmission bandwidth. This makes it possible to increase the number of terminals that can orthogonalize DM-RSs in MU-MIMO communication and increase the multiplex number of MU-MIMO communication.

CITATION LIST

Patent Literature

PTL 1
Japanese Patent Publication No. 4624475

Non-Patent Literature

NPL 1
3GPP TS36.211 V10.2.0, "Physical Channels and Modulation (Release 10)," 5.5 Reference Signals, June 2011

NPL 2
3GPP R1-113810, Panasonic, "DMRS enhancement for UL CoMP," 3GPP TSG RAN WG1 Meeting #67, San-Francisco, U.S.A, Nov. 14-18, 2011

SUMMARY OF INVENTION

Technical Problem

However, the above-described related arts consider only orthogonalization between ZC sequences and do not consider orthogonality between a CG sequence which is a code sequence for DM-RSs having a transmission bandwidth of 1 and 2 RBs and a ZC sequence which is a code sequence for DM-RSs having a transmission bandwidth of 3 or more RBs. More specifically, as shown in FIG. 6A, orthogonalization by CS is possible between ZC sequences (transmission bandwidth: 3 RBs and 4 RBs in FIG. 6A), whereas as shown in FIG. 6B, orthogonalization by CS is not possible between a CG sequence (transmission bandwidth: 2 RBs) and a ZC sequence (transmission bandwidth: 3 RBs). For this reason, when UL CoMP is applied between a terminal using 1 RB or 2 RBs and a terminal using 3 or more RBs, channel estimation accuracy deteriorates due to interference of unorthogonalized DM-RS, and sufficient CoMP performance cannot be obtained, resulting in a problem in that it is not possible to increase the multiplex number of MU-MIMO communication.

An object of the present invention is to provide a transmitting apparatus and a transmission method that orthogonalizes DM-RSs in different transmission bandwidths, and can thereby improve CoMP performance and increase a multiplex number of MU-MIMO communication.

Solution to Problem

A transmitting apparatus according to an aspect of the present invention includes: a generating section that generates, when coordinated reception at a plurality of receiving apparatuses is applied, a reference signal having a transmission bandwidth less than a predetermined number using a first sequence used for a reference signal having a transmission bandwidth equal to or greater than the predetermined number, and that generates, when the coordinated reception is not applied, the reference signal having a transmission bandwidth less than the predetermined number using a second sequence different from the first sequence; and a transmitting section that transmits the reference signal.

A transmission method according to an aspect of the present invention includes: generating, when coordinated reception at a plurality of receiving apparatuses is applied, a reference signal having a transmission bandwidth less than a predetermined number using a first sequence used for a reference signal having a transmission bandwidth equal to or greater than the predetermined number, and generating, when the coordinated reception is not applied, a reference signal having a transmission bandwidth less than the predetermined number using a second sequence different from the first sequence; and transmitting the reference signal.

Advantageous Effects of Invention

According to the present invention, it is possible to improve CoMP performance and increase a multiplex number of MU-MIMO communication by orthogonalizing DM-RSs of different transmission bandwidths.

BRIEF DESCRIPTION OF DRAWINGS

FIG. 3 illustrates parameters of a CG sequence in each sequence group;

FIG. 4 illustrates parameters of a CG sequence in each sequence group;

FIG. 13 illustrates an example of a ZC sequence number table according to Embodiment 1 of the present invention (generation example 1);

FIG. 15 illustrates an example of a ZC sequence number table according to Embodiment 1 of the present invention (generation example 2);

FIG. 16 illustrates an example of a ZC sequence number table according to Embodiment 1 of the present invention (generation example 3);

FIG. 18 illustrates an example of a ZC sequence number table according to Embodiment 1 of the present invention (generation example 4);

FIG. 20 illustrates an example of a ZC sequence number table according to Embodiment 2 of the present invention (generation example 1);

FIG. 21 illustrates an example of a ZC sequence number table according to Embodiment 2 of the present invention (generation example 3);

FIG. 22 illustrates an example of a ZC sequence number table according to Embodiment 2 of the present invention (generation example 4);

DESCRIPTION OF EMBODIMENTS

Hereinafter, embodiments of the present invention will be described in detail with reference to the accompanying drawings.

Before describing a specific configuration and operation of each embodiment of the present invention, a method focused by the present inventor et al. will be described as a method for generating a DM-RS sequence for orthogonalizing DM-RSs even when UL CoMP is applied between a terminal using a transmission bandwidth of 1 RB or 2 RBs and a terminal using a transmission bandwidth of 3 or more RBs.

Figure 7A:
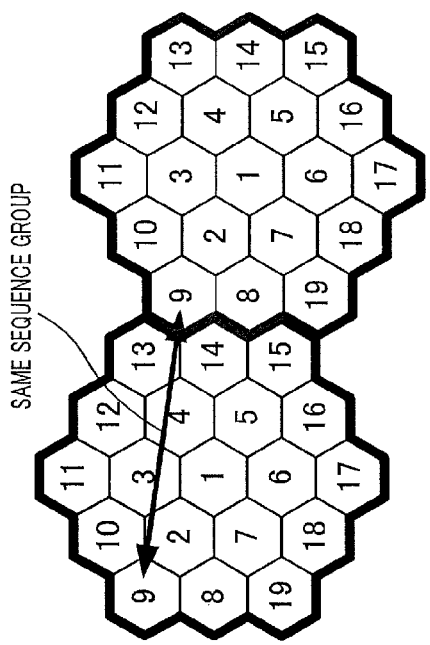
FIGS. 7A and 7B are diagrams provided for describing a difference in reuse factors depending on whether CoMP is applied or not.

As shown in FIG. 7A, when CoMP is not applied, a sequence group is applied which differs from one cell (base station) to another (cell-specific sequence assignment) as described above. In contrast, as shown in FIG. 7B, when CoMP is applied, an identical sequence group is applied between cells (base stations; three cells in FIG. 7A) that cooperate to receive signals from a UL CoMP terminal (UE-specific sequence assignment).

Figure 7B:
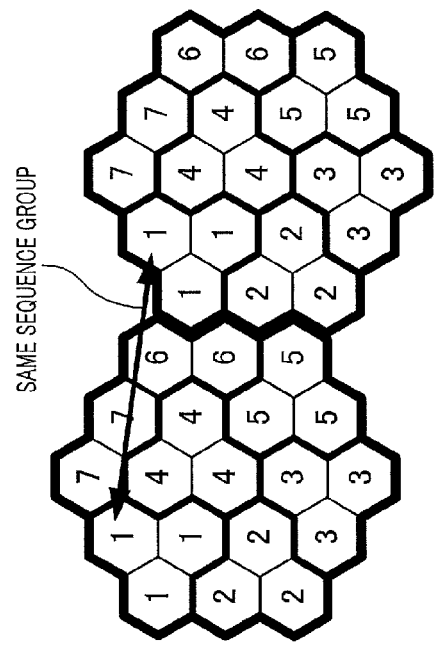

In this case, as shown in FIG. 7A and FIG. 7B, sequence group numbers 1 to 19 are repeatedly used for an identical area in FIG. 7A, whereas sequence group numbers 1 to 7 are repeatedly used in FIG. 7B. That is, compared to FIG. 7A (no CoMP is applied), the number of reuse factors is reduced in FIG. 7B (CoMP is applied). However, in FIG. 7B, since the identical sequence group is applied among cells that cooperate to receive signals through CoMP, the distance between cells to which the identical sequence group is applied is not so short compared to FIG. 7A.

CoMP is mainly applied to a HetNet environment where the distance between a terminal and a base station is shorter than the conventional case, so that transmission power of the terminal is therefore smaller in this case. Thus, although even when the same sequence number is applied among nearby cells because of the decrease in the number of reuse factors, interference between cells to which the same sequence number is applied is not a significant problem.

In this way, the present inventor et al. note that it is not a significant problem even when the number of reuse factors of ZC sequence numbers used for DM-RSs decreases in a UL CoMP terminal (terminal to which a UE-specific sequence is assigned).

Thus, in the following description, the UL CoMP terminal uses not a CG sequence but a ZC sequence as DM-RSs when transmitting DM-RSs in a transmission bandwidth of 1 or 2 RBs. Thus, DM-RSs having different transmission bandwidths (including 1 or 2 RBs) can be orthogonalized by applying a cyclic shift corresponding to each transmission bandwidth to the ZC sequence (e.g., see NPL 2). That is, as described above, even when a ZC sequence is used in a transmission bandwidth of 1 or 2 RBs, it is possible to increase a multiplex number in MU-MIMO communication while reducing an increase of inter-cell interference caused by a decrease of the number of reuse factors.

(Embodiment 1)

[Overview of Communication System]

A communication system according to Embodiment 1 of the present invention includes a transmitting apparatus and a receiving apparatus. Especially, the present embodiment will be described assuming that the transmitting apparatus is terminal 100 and the receiving apparatus is base station 200. This communication system is, for example, an LTE-Advanced system. Terminal 100 is, for example, a terminal compliant with the LTE-Advanced system and base station 200 is, for example, a base station compliant with the LTE-Advanced system. For example, when terminal 100 operates, for example, as a UL CoMP terminal, signals transmitted from terminal 100 are received by a plurality of base station 200 in cooperation.

Figure 8:
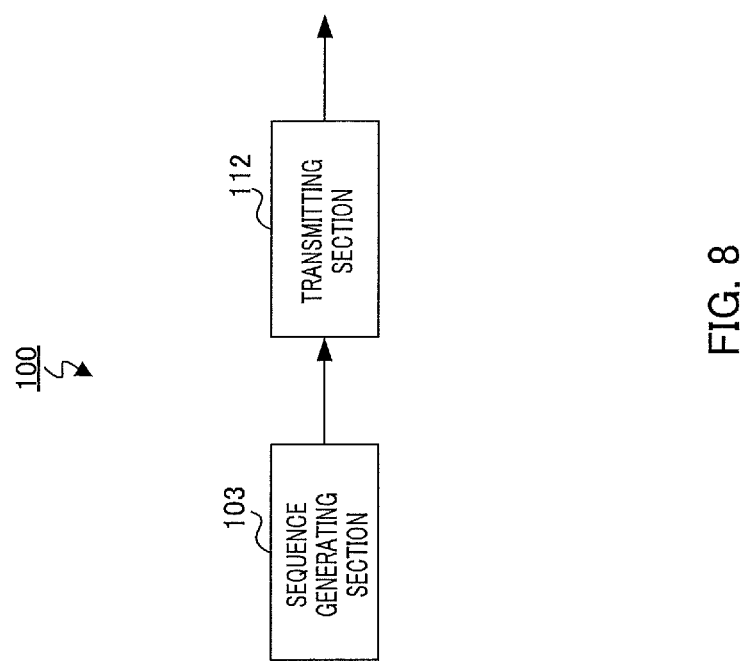
FIG. 8 is a block diagram illustrating a main configuration of a terminal according to Embodiment 1 of the present invention.

FIG. 8 is a main configuration diagram of terminal 100 according to Embodiment 1 of the present invention. In terminal 100, sequence generating section 103 generates, when coordinated reception by a plurality of base stations 200 (receiving apparatuses) is applied, DM-RSs (reference signals) of a transmission bandwidth less than a predetermined number (here 3 RBs) using a ZC sequence (first sequence) used for DM-RSs of a transmission bandwidth equal to or greater than the predetermined number, and generates, when coordinated reception is not applied, DM-RSs of a transmission bandwidth less than the predetermined number using a CG sequence (second sequence) which is different from the ZC sequence. Transmitting section 112 transmits the DM-RSs.

[Configuration of Terminal 100]

Figure 9:
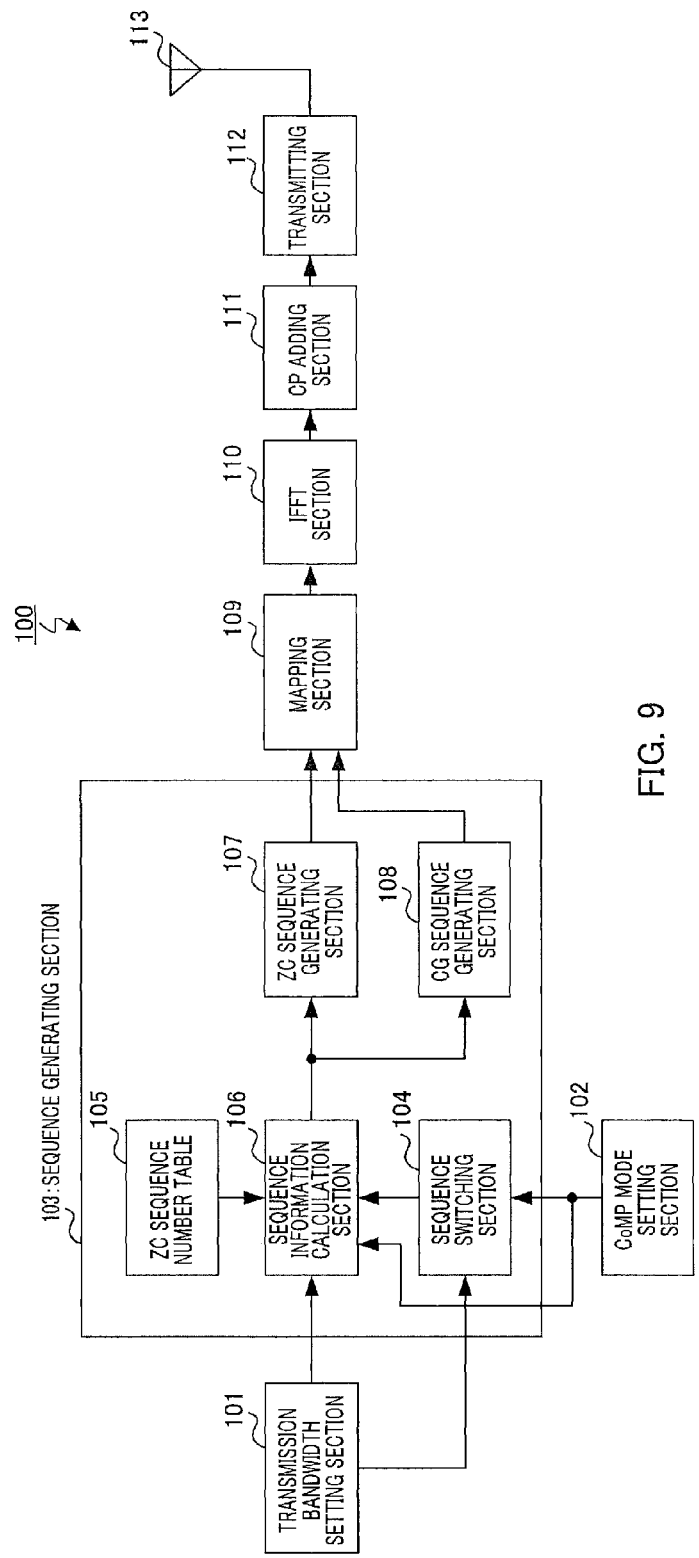
FIG. 9 is a block diagram illustrating a configuration of the terminal according to Embodiment 1 of the present invention.
Figure 10:
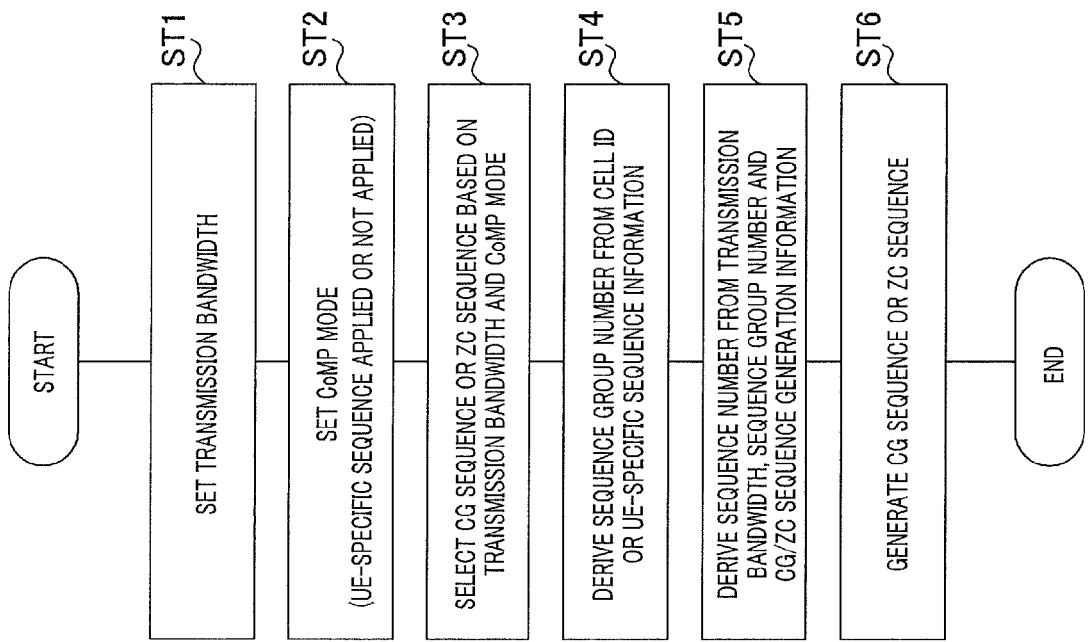
FIG. 10 is a flowchart illustrating DM-RS sequence generation processing in the terminal according to Embodiment 1 of the present invention.

FIG. 9 is a block diagram illustrating a configuration of terminal 100 according to the present embodiment. FIG. 10 is a flowchart illustrating DM-RS code sequence (DM-RS sequence) generation processing in terminal 100.

In terminal 100, transmission bandwidth setting section 101 sets a transmission bandwidth of DM-RS (step shown in FIG. 10 (hereinafter represented by "ST") 1), and outputs the set transmission bandwidth to sequence switching section 104 and sequence information calculation section 106 of sequence generating section 103.

CoMP mode setting section 102 sets application or no application of a CoMP mode or not, and application or no application of a UE-specific sequence (ST2 shown in FIG. 10), and outputs information indicating the application or no application to sequence switching section 104 and sequence information calculation section 106 of sequence generating section 103.

Sequence generating section 103 generates a DM-RS sequence according to the transmission bandwidth of DM-RS set by transmission bandwidth setting section 101, application or no application of the CoMP mode (UE-specific sequence) set by CoMP mode setting section 102. Sequence generating section 103 is mainly configured of sequence switching section 104, ZC sequence number table 105, sequence information calculation section 106, ZC sequence generating section 107, and CG sequence generating section 108.

More specifically, sequence switching section 104 switches a sequence to be used as a DM-RS sequence between a ZC sequence and a CG sequence based on the transmission bandwidth of DM-RS and application or no application of the CoMP mode (ST3 shown in FIG. 10). For example, when the transmission bandwidth is 3 or more RBs, sequence switching section 104 selects a ZC sequence irrespective of the application or no application of the CoMP mode. When the transmission bandwidth is 1 or 2 RBs and CoMP is applied, sequence switching section 104 selects the ZC sequence. On the other hand, when the transmission bandwidth is 1 or 2 RBs and CoMP is not applied, sequence switching section 104 selects the CG sequence. That is, when the transmission bandwidth is 1 or 2 RBs and the CoMP mode is applied, sequence switching section 104 selects the ZC sequence used for DM-RS having a transmission bandwidth of 3 or more RBs, and when the CoMP mode is not applied, sequence switching section 104 selects the CG sequence different from the ZC sequence used for DM-RS having a transmission bandwidth of 3 or more RBs. Sequence switching section 104 outputs CG/ZC sequence generation information indicating whether the selected sequence is the CG sequence or the ZC sequence to sequence information calculation section 106.

ZC sequence number table 105 is a table that includes the association between transmission bandwidth 1 or 2 RBs and a ZC sequence number (for transmission bandwidth of 1 or 2 RBs) usable for DM-RS in each sequence group. The table is shared between terminal 100 and base station 200. An example of ZC sequence number table 105 and details of a method of generating ZC sequence number table 105 will be described later.

Sequence information calculation section 106 calculates a sequence group number using a cell ID when the CoMP mode is not applied and using UE-specific sequence information when the CoMP mode is applied (ST4 shown in FIG. 10). Next, sequence information calculation section 106 calculates a sequence number using the calculated sequence group number, transmission bandwidth and CG/ZC sequence generation information (ST5 shown in FIG. 10). In this case, when the CoMP mode is applied and a ZC sequence for 1 or 2 RBs is generated, sequence information calculation section 106 calculates the sequence number with reference to ZC sequence number table 105. Sequence information calculation section 106 outputs sequence information including the calculated sequence number and the type of sequence (CG sequence or ZC sequence) to ZC sequence generating section 107 and CG sequence generating section 108.

When the sequence information indicates that a ZC sequence will be generated, ZC sequence generating section 107 generates a ZC sequence using the sequence number shown in the sequence information (ST6 shown in FIG. 10), and outputs the ZC sequence as a DM-RS sequence to mapping section 109.

When the sequence information indicates that a CG sequence will be generated, CG sequence generating section 108 generates a CG sequence (ST6 shown in FIG. 10) and outputs the CG sequence as a DM-RS sequence to mapping section 109.

Mapping section 109 maps the DM-RS sequence (ZC sequence or CG sequence) inputted from ZC sequence generating section 107 or CG sequence generating section 108 to a band corresponding to the transmission band of terminal 100. Mapping section 109 outputs the mapped DM-RS sequence to IFFT (inverse fast Fourier transform) section 110.

IFFT section 110 applies IFFT processing to the DM-RS sequence inputted from mapping section 109 and outputs the DM-RS sequence subjected to the IFFT processing to CP (cyclic prefix) adding section 111.

CP adding section 111 adds the same signal as the rear end portion of the signal after the IFFT to the leading portion as a CP and outputs the signal to transmitting section 112.

Transmitting section 112 applies transmission processing such as D/A conversion, up-conversion, amplification to the signal with the CP and transmits the signal subjected to the transmission processing as a DM-RS via antenna 113. Terminal 100 transmits a data signal together with the DM-RS (reference signal) via antenna 113 (not shown).

[Configuration of Base Station 200]

Figure 11:
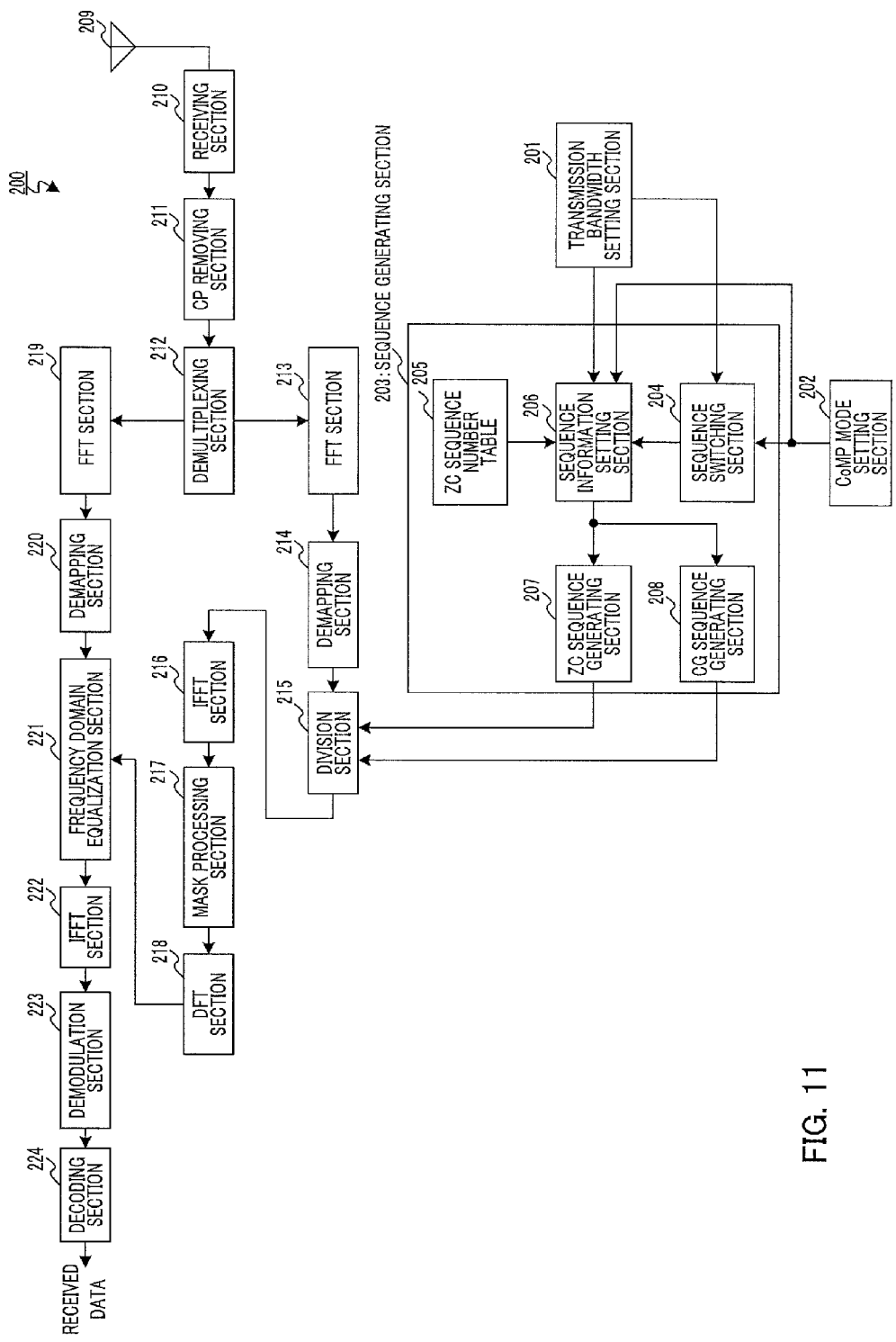
FIG. 11 is a block diagram illustrating a configuration of a base station according to Embodiment 1 of the present invention.

FIG. 11 is a block diagram illustrating a configuration of base station 200 according to the present embodiment.

In base station 200, as in the case of transmission bandwidth setting section 101, transmission bandwidth setting section 201 sets the transmission bandwidth of a DM-RS used in terminal 100 and outputs the set transmission bandwidth to sequence switching section 204 and sequence information calculation section 206 of sequence generating section 203.

As in the case of CoMP mode setting section 102, CoMP mode setting section 202 sets application or no application of the CoMP mode (application or no application of a UE-specific sequence) for terminal 100 and outputs information indicating the application or no application to sequence switching section 204 and sequence information calculation section 206 of sequence generating section 203.

As in the case of sequence generating section 103, sequence generating section 203 generates a DM-RS sequence to be used in terminal 100 in accordance with the DM-RS transmission bandwidth set by transmission bandwidth setting section 201 and the application or no application of the CoMP mode (UE-specific sequence) set by CoMP mode setting section 202. Sequence generating section 203 is mainly configured of sequence switching section 204, ZC sequence number table 205, sequence information calculation section 206, ZC sequence generating section 207, and CG sequence generating section 208.

More specifically, as in the case of sequence switching section 104, sequence switching section 204 selects a ZC sequence or CG sequence as a sequence to be used as a DM-RS sequence in terminal 100 based on the DM-RS transmission bandwidth and application or no application of the CoMP mode. That is, as in the case of sequence switching section 104, sequence switching section 204 selects, when the transmission bandwidth is 1 or 2 RBs and when the CoMP mode is applied, a ZC sequence to be used for a DM-RS having a transmission bandwidth of 3 or more RBs and selects, when the CoMP mode is not applied, a CG sequence which is different from the ZC sequence used for the DM-RS having a transmission bandwidth of 3 or more RBs. Sequence switching section 204 outputs CG/ZC sequence generation information indicating whether the selected sequence is a CG sequence or a ZC sequence to sequence information calculation section 206.

As in the case of ZC sequence number table 105, ZC sequence number table 205 is a table that associates the transmission bandwidth of 1 or 2 RBs with a ZC sequence number usable for a DM-RS. The table is shared between base station 200 and terminal 100. An example of ZC sequence number table 105 and details of a method of generating ZC sequence number table 105 will be described later.

As in the case of sequence information calculation section 106, sequence information calculation section 206 derives a sequence group number using a cell ID when the CoMP mode is not applied and using UE-specific sequence information when the CoMP mode is applied. Next, sequence information calculation section 206 calculates a sequence number using the derived sequence group number, transmission bandwidth and CG/ZC sequence generation information. In this case, when the CoMP mode is applied and when a ZC sequence for 1 or 2 RBs is generated, sequence information calculation section 206 calculates a sequence number with reference to ZC sequence number table 205. Sequence information calculation section 206 outputs sequence information including the calculated sequence number and the type of the sequence (CG sequence or ZC sequence) to ZC sequence generating section 207 and CG sequence generating section 208.

As in the case of ZC sequence generating section 107, ZC sequence generating section 207 generates a ZC sequence using the sequence number shown in the sequence information when the sequence information indicates that a ZC sequence will be generated and outputs the ZC sequence as a DM-RS sequence to division section 215.

As in the case of CG sequence generating section 108, CG sequence generating section 208 generates a CG sequence when the sequence information indicates that a CG sequence will be generated and outputs the CG sequence as a DM-RS sequence to division section 215.

Receiving section 210 applies reception processing such as down-conversion, A/D conversion to a signal received via antenna 209 and outputs the signal subjected to the reception processing to CP removing section 211. The received signal includes a data signal and DM-RS.

CP removing section 211 removes a CP from the signal subjected to the reception processing and outputs the signal without the CP to demultiplexing section 212.

Demultiplexing section 212 demultiplexes the signal inputted from CP removing section 211 into a DM-RS and data signal. Demultiplexing section 212 outputs the DM-RS to FFT (fast Fourier transform) section 213 and outputs the data signal to FFT section 219.

FFT section 213 applies FFT processing to the DM-RS inputted from demultiplexing section 212, to transform the DM-RS from a time domain signal into a frequency domain signal. FFT section 213 outputs the DM-RS transformed into the frequency domain signal to demapping section 214.

Demapping section 214 extracts a portion corresponding to a transmission band of each terminal 100 from the frequency domain DM-RS inputted from FFT section 213 and outputs the extracted DM-RS to division section 215.

Division section 215 divides the DM-RS inputted from demapping section 214 by the DM-RS sequence (ZC sequence or CG sequence) inputted from ZC sequence generating section 207 or CG sequence generating section 208 and outputs the division result (correlation value) to IFFT section 216.

IFFT section 216 applies IFFT processing to the division result inputted from division section 215 and outputs the signal subjected to the IFFT processing to mask processing section 217.

Mask processing section 217 applies mask processing to the signal inputted from IFFT section 216, thereby extracts a correlation value of an interval in which a correlation value of desired cyclic shift sequence exists (window portion) and outputs the extracted correlation value to DFT section 218.

DFT section 218 applies DFT processing to the correlation value inputted from mask processing section 217 and outputs the correlation value subjected to the DFT processing to frequency domain equalization section 221. The signal subjected to the DFT processing in DFT section 218 is a signal showing a frequency fluctuation of the propagation path (frequency response of a propagation path).

On the other hand, FFT section 219 applies FFT processing to the data signal inputted from demultiplexing section 212 to transform the data signal from a time domain signal into a frequency domain signal. FFT section 219 outputs the data signal transformed into the frequency domain signal to demapping section 220.

Demapping section 220 extracts a data signal of a portion corresponding to the transmission band of each terminal from the signal inputted from FFT section 219 and outputs each extracted signal to frequency domain equalization section 221.

Frequency domain equalization section 221 applies equalization processing to the data signal inputted from demapping section 220 using the signal inputted from DFT section 218 (frequency response of the propagation path) and outputs the signal subjected to the equalization processing to IFFT section 222.

IFFT section 222 applies IFFT processing to the data signal inputted from frequency domain equalization section 221 and outputs the signal subjected to the IFFT processing to demodulation section 223.

Demodulation section 223 applies demodulation processing to the signal inputted from IFFT section 222 and outputs the signal subjected to the demodulation processing to decoding section 224.

Decoding section 224 applies decoding processing to the signal inputted from demodulation section 223 and extracts received data.

[Operations of Terminal 100 and Base Station 200]

Operations of terminal 100 and base station 200 configured as described above will be described.

When terminal 100 is a UL CoMP terminal (terminal to which the CoMP mode is applied), terminal 100 generates a DM-RS using a ZC sequence as a DM-RS sequence having a transmission bandwidth of 1 or 2 RBs. On the other hand, when terminal 100 is not a UL CoMP terminal, terminal 100 generates a DM-RS using a CG sequence as a DM-RS sequence having a transmission bandwidth of 1 or 2 RBs as in the case of the related art.

As described above, a lot of sequences are divided into 30 sequence groups at each transmission bandwidth (1 to 110 RBs) and transmission bandwidths and sequences are associated with each other in each sequence group. More specifically, regarding a ZC sequence, a ZC sequence of sequence number q corresponding to a minimum absolute value of a difference between $q_b/N_b$ and q/N is grouped as a group of group number u with respect to sequence length N corresponding to each of a plurality of transmission bandwidths. Here, $N_b$ is a reference sequence length and $q_b$ is a reference sequence number of group number u. That is, when the CoMP mode is applied, terminal 100 generates a DM-RS using one of grouped ZC sequences.

As in the case of terminal 100, when the transmission bandwidth of the DM-RS used for terminal 100 whose signal is to be extracted is 1 or 2 RBs and terminal 100 is a UL CoMP terminal, base station 200 determines that the code sequence used as the DM-RS sequence is a ZC sequence, whereas when terminal 100 is not a UL CoMP terminal, base station 200 determines that the code sequence used as the DM-RS sequence is a CG sequence.

In this way, within a CoMP set, even when DM-RSs having a transmission bandwidth of 1 or 2 RBs and DM-RSs having a transmission bandwidth of 3 or more RBs are included among a plurality of terminals 100 (terminals having the same UE-specific sequence), the DM-RSs can be orthogonalized by CS.

Next, generation examples 1 to 4 of generating ZC sequence number table 105 (ZC sequence number table 205) used in terminal 100 (FIG. 9) and base station 200 (FIG. 11) will be described.

In the following description, it is assumed that the number of sequence groups is 30 (sequence group numbers 0 to 29). 1 RB consists of 12 subcarriers. The sequence length of a ZC sequence is assumed to be a maximum prime number within the number of subcarriers corresponding to each transmission bandwidth (number of RBs). For example, it is assumed that the sequence length in the case of 1 RB (12 subcarriers) is 11, the sequence length in the case of 2 RBs (24 subcarriers) is 23 and the sequence length in the case of 3 RBs (36 subcarriers) is 31.

GENERATION EXAMPLE 1

In generation example 1, sequence number q when the value of $q_b/N_b$ which is a ratio of sequence number $q_b$ of a ZC sequence of group number u assigned to a transmission bandwidth of 3 RBs and sequence length $N_b$ corresponding to the transmission bandwidth of 3 RBs becomes closest to the value of q/N which is a ratio of sequence number q of a ZC sequence for 1 or 2 RBs and sequence length N is assigned as the ZC sequence number for 1 or 2 RBs of the UL CoMP terminal (terminal to which a UE-specific sequence is assigned) in group number u. That is, the ZC sequence of sequence number q corresponding to a minimum absolute value of the difference between $q_b/N_b$ and q/N is included in the sequence group of group number u.

Figure 12:
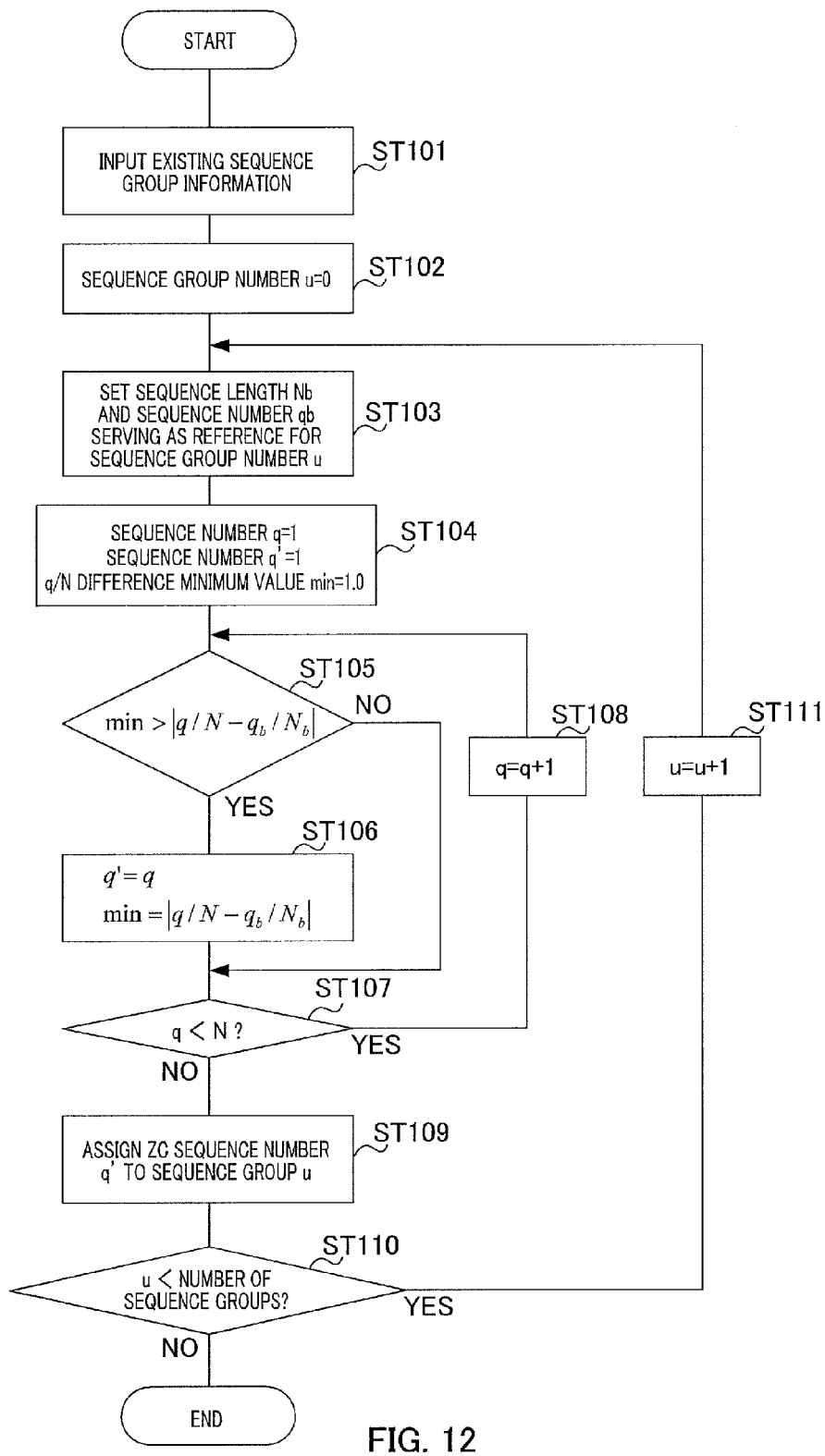
FIG. 12 is a flowchart illustrating ZC sequence number table generation processing according to Embodiment 1 of the present invention (generation example 1)

FIG. 12 is a flowchart illustrating an example of processing of generating a ZC sequence number table (105 shown in FIG. 9, 205 shown in FIG. 11) corresponding to the transmission bandwidth of 1 or 2 RBs (that is, less than 3 RBs). The ZC sequence number table is generated beforehand by, for example, a table generating section (or a table generating program, not shown). That is, terminal 100 and base station 200 store ZC sequence number tables (105, 205) generated through the processing shown, for example, in FIG. 12. For example, the ZC sequence number table generated by the table generating section may be indicated from base station 200 to terminal 100 or the table generating sections in terminal 100 and base station 200 may generate ZC sequence tables respectively. The table generating section may be included in another apparatus other than terminal 100 or base station 200.

In ST101, the table generating section generates (inputs) sequence group information such as a sequence group, ZC sequence number for each transmission band (existing sequence group information, for example, ZC sequence group of 3 or more RBs) using, for example, the method of generating a DM-RS disclosed in NPL 1.

In ST102, the table generating section sets 0 as an initial value of sequence group number u to determine a ZC sequence number for each of 30 sequence groups.

In ST103, the table generating section sets sequence length $N_b$ and sequence number $q_b$ having a transmission bandwidth of 3 RBs as a reference sequence length and a reference sequence number respectively to derive a ZC sequence number for 1 or 2 RBs in sequence group number u.

In ST104, the table generating section sets 1 as an initial value of sequence number q (1 to sequence length N−1), sets 1 as an initial value of finally determined ZC sequence number q' having a transmission bandwidth of 1 or 2 RBs in sequence group number u and sets 1.0 as an initial value of variable min for saving a minimum value of the difference between q/N which is a ratio of sequence number q and sequence length N and $q_b/N_b$ in a transmission bandwidth of 3 RBs.

In ST105, the table generating section measures an absolute value of the difference between q/N and $q_b/N_b$, and determines whether variable min is greater than the measured absolute value or not. When variable min is greater than the above-described absolute value (ST105: YES), the table generating section moves to processing in ST106 and when variable min is equal to or less than the above-described absolute value (ST105:NO), the table generating section moves to processing in ST107.

In ST106, the table generating section sets q' in q and sets min in the absolute value of the difference between q/N and $q_b/N_b$ in the current value of q.

In ST107, the table generating section determines whether q is less than N or not (that is, whether determinations on all sequence numbers have been completed or not). When q is less than N (ST107: YES), the table generating section moves to processing in ST108 and when q is equal to or greater than N (ST107: NO), the table generating section moves to processing in ST109.

In ST108, the table generating section increments q (counts up by 1) and moves to the processing in ST105 again.

By executing the loop in ST105 to ST108 while changing the value of q in this way, sequence number q' corresponding to minimum value min of the difference between q/N and $q_b/N_b$ is determined.

In ST109, the table generating section calculates the difference between q/N and $q_b/N_b$ for all q's (1 to sequence length N−1) in sequence group number u and then finally assigns the value saved in variable q' to a sequence number of sequence group number u.

In ST110, the table generating section determines whether sequence group number u (0 to 29) is less than the number of sequence groups (30) or not. When u is less than the number of sequence groups (ST110: YES), the table generating section moves to ST111 and when u is equal to or greater than the number of sequence groups (ST110: NO), since calculations of ZC sequence numbers for all sequence groups have been completed, the table generating section ends the processing of generating ZC sequence number table 105 (ZC sequence number table 205).

In ST111, the table generating section increments u (counts up by 1) and moves to the processing in ST103 again.

When the processes in ST101 to ST111 shown in FIG. 12 are performed on transmission bandwidths of 1 and 2 RBs respectively, ZC sequence number tables (105, 205) are generated.

Figure 1:
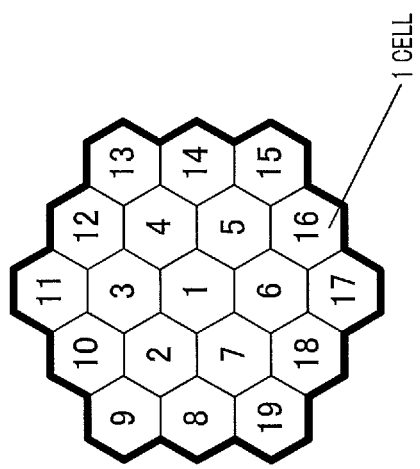
FIG. 1 illustrates sequence group assignment.
Figure 2:
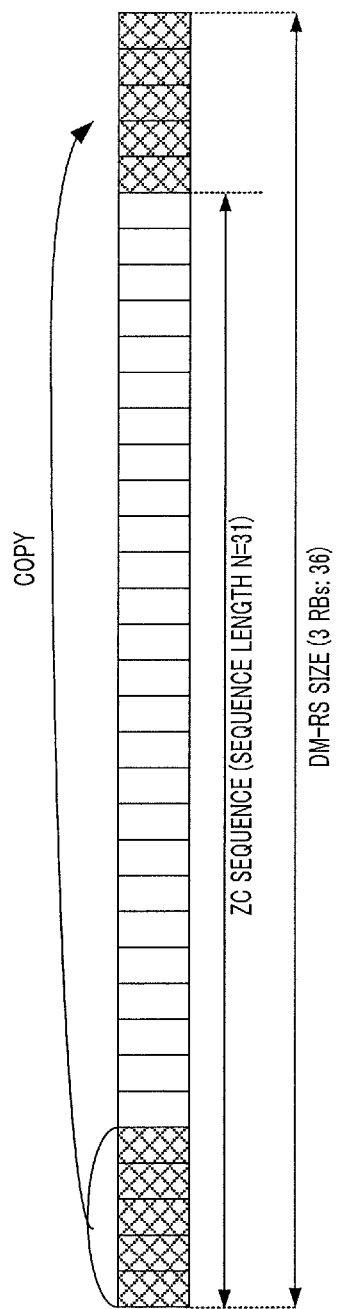
FIG. 2 illustrates extension processing on a ZC sequence.
Figure 5:
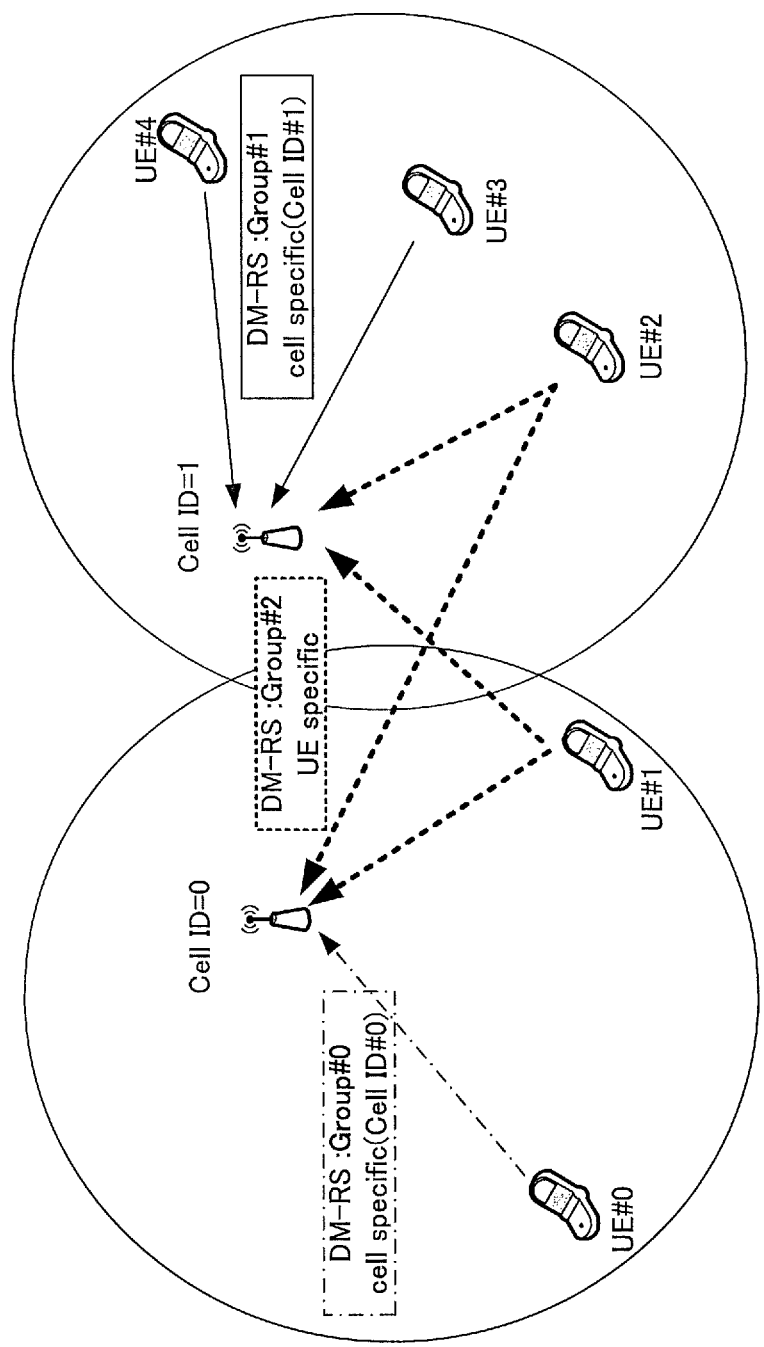
FIG. 5 is a diagram provided for describing a UE-specific sequence.
Figures 6A, 6B:
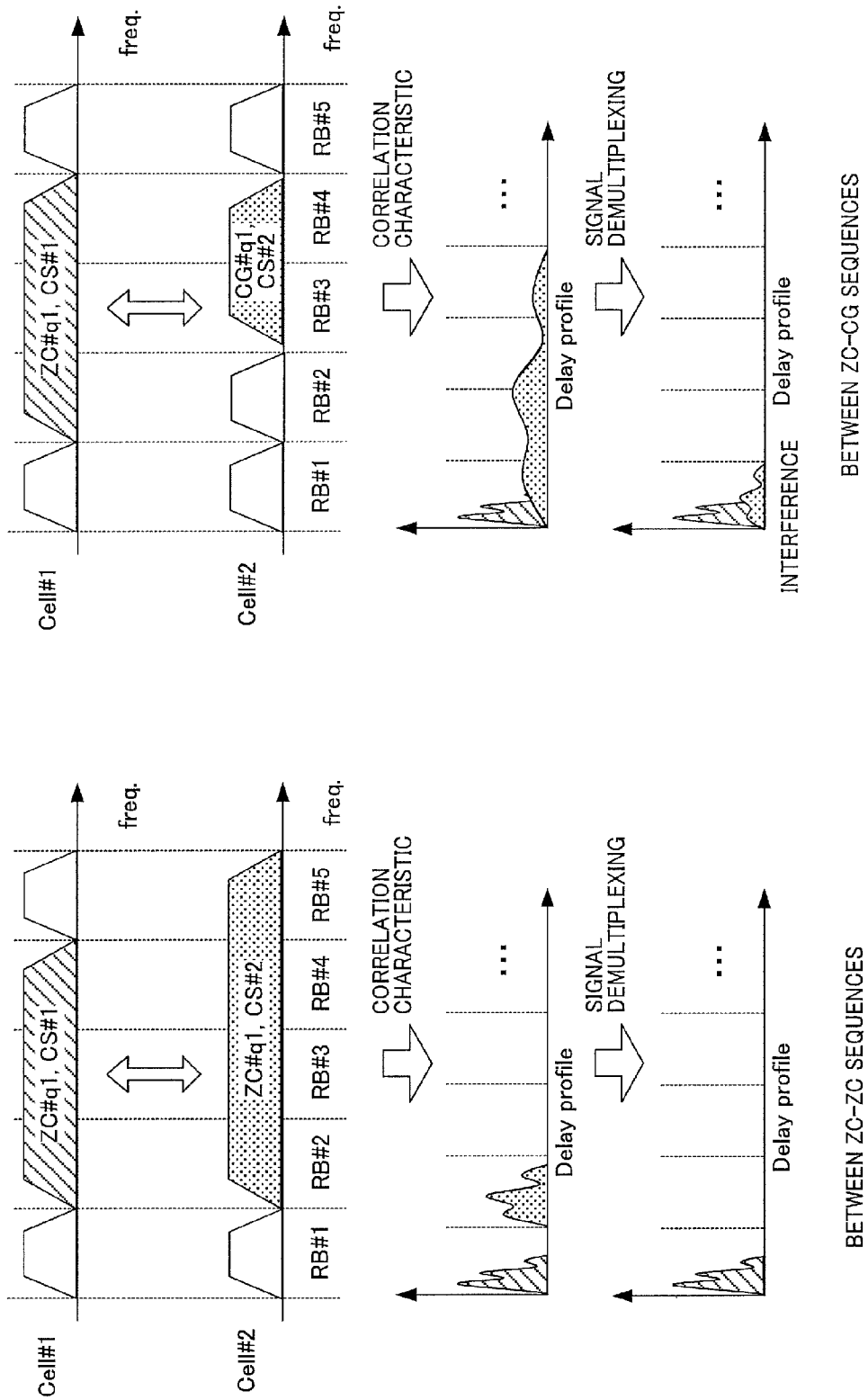
FIGS. 6A and 6B are diagrams provided for describing orthogonalization between ZC sequences and orthogonalization between a ZC sequence and a CG sequence.

FIG. 13 illustrates an example of ZC sequence number table 105 (ZC sequence number table 205) generated through the above-described processes. In the transmission bandwidth of 3 RBs shown in FIG. 13, sequence numbers $q_b$ for sequence group numbers u=0 to 29 are 1 to 30 respectively and sequence length $N_b$ is 31. Thus, in the transmission bandwidth of 1 RB (sequence length N=11) shown in FIG. 13 and 2 RBs (sequence length N=23), sequence number q corresponding to the minimum absolute value of the difference between q/N and $q_b/N_b$ is assigned for sequence group numbers u=0 to 29.

Furthermore, a relationship between sequence numbers in transmission bandwidths of 1, 2, and 3 RBs in ZC sequence number table 105 (ZC sequence number table 205) shown in FIG. 13 is defined as following equation 5.

[5]

$$q_{3RB} = \lfloor \bar{q}_{3RB} + 1/2 \rfloor + v \cdot (-1)^{\lfloor 2\bar{q}_{3RB} \rfloor}$$

$$\bar{q}_{3RB} = N_{ZC\_3RB}^{RS} \cdot (u+1)/31$$

$$q_{2RB} = \arg\min_k(|q_{3RB}/N_{ZC\_3RB}^{RS} - k/N_{ZC\_2RB}^{RS}|),$$
$$k=1,2\ldots,N_{ZC\_2RB}^{RS}-1$$

$$q_{1RB} = \arg\min_k(|q_{3RB}/N_{ZC\_3RB}^{RS} - k/N_{ZC\_1RB}^{RS}|),$$
$$k=1,2\ldots,N_{ZC\_1RB}^{RS}-1$$

(Equation 5)

In equation 5, $q_{XRB}$ represents a sequence number of transmission bandwidth X[RB], $N_{ZC\_XRB}^{RS}$ represents a ZC sequence length of transmission bandwidth X[RB], u represents a sequence group number and v represents a flag (0 or 1) of sequence group hopping.

Here, the ZC sequence number of each sequence group in a transmission bandwidth of 3 or more RBs is calculated with reference to $q_b$ (1 to 30 in FIG. 13) and $N_b$ (31 RBs) in 3 RBs (ST101). That is, in FIG. 13, reference sequence length $N_b$ and reference sequence number $q_b$ corresponding to the transmission bandwidth of 1 or 2 RBs (less than 3 RBs) are identical to the reference sequence length and reference sequence number corresponding to the transmission bandwidth of 3 or more RBs.

Thus, when CoMP is applied, terminal 100 uses a ZC sequence as the DM-RS sequence irrespective of the transmission bandwidth, and can thereby orthogonalize a DM-RS having a transmission bandwidth of 1 RB (or 2 RBs) and a DM-RS having a transmission bandwidth of 3 or more RBs within a CoMP set.

As described above, since a maximum of (sequence length N−1) ZC sequences are generated, 10 ZC sequences are generated when the transmission bandwidth is 1 RB (N=11) and 22 ZC sequences are generated when the transmission bandwidth is 2 RBs (N=23). For this reason, since it is not possible to assign different ZC sequences to 30 sequence groups respectively when the transmission bandwidth is 1 or 2 RBs, the same sequence number is repeatedly assigned to a plurality of sequence groups as shown in FIG. 13. However, as described above, a reduction of the number of reuse factors poses no problem (see FIG. 7A and FIG. 7B) with CoMP, and therefore the influence of interference among cells using sequence groups to which the same sequence number is assigned is small.

Thus, according to generation example 1, it is possible to orthogonalize a DM-RS (ZC sequence) between terminals 100 within a CoMP set (terminals 100 having the same UE-specific sequence) irrespective of the transmission bandwidth of the DM-RS, and thereby improve the channel estimation accuracy and increase the multiplex number in MU-MIMO communication.

GENERATION EXAMPLE 2

In generation example 2, the difference in the number of times a ZC sequence number assigned to each sequence group as a ZC sequence number for 1 or 2 RBs of a UL CoMP terminal (terminal to which a UE-specific sequence is assigned) is used is assumed to be a maximum of 1.

Figure 14:
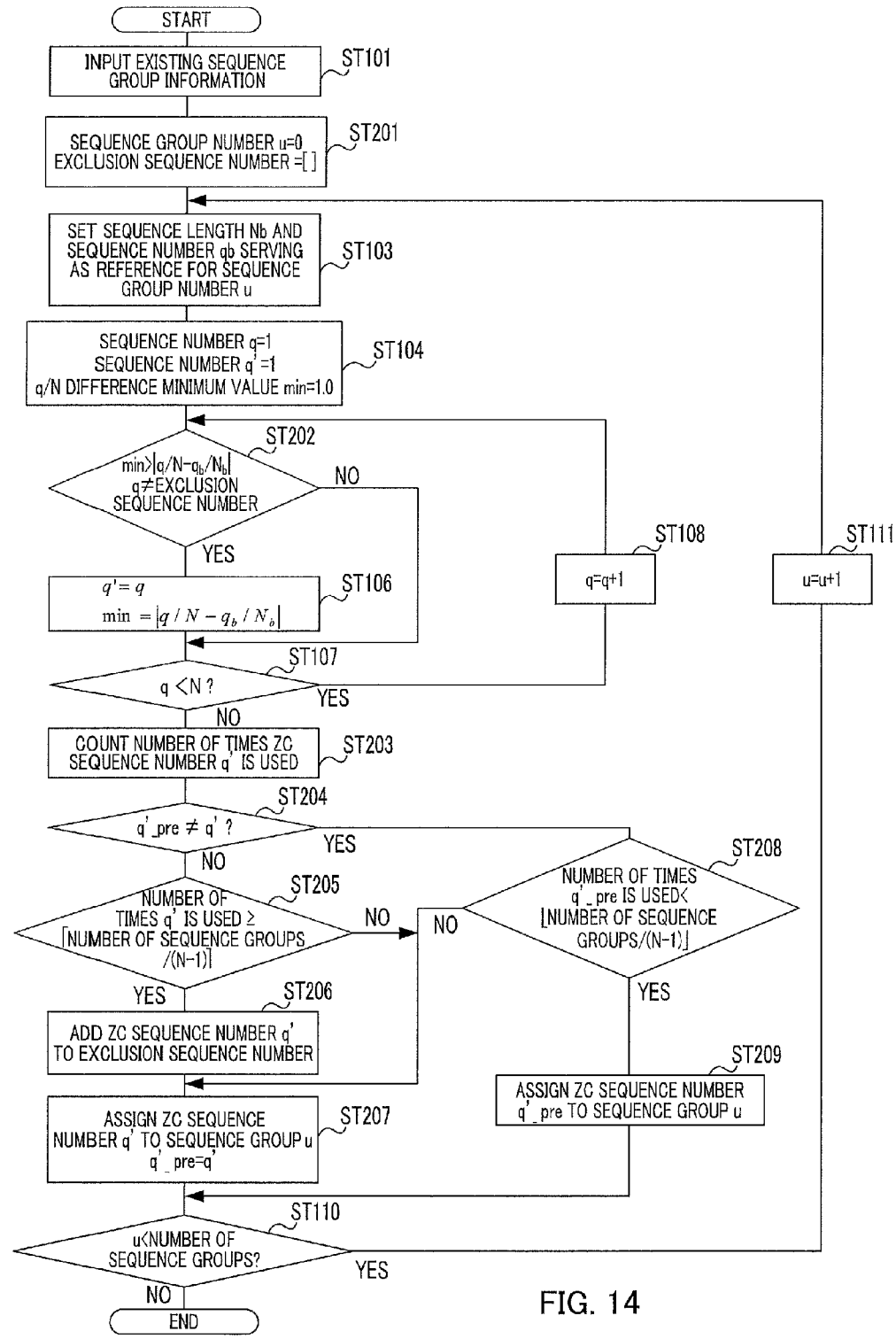
FIG. 14 is a flowchart illustrating ZC sequence number table generation processing according to Embodiment 1 of the present invention (generation example 2)

FIG. 14 is a flowchart illustrating an example of processing of generating ZC sequence number table 105 (ZC sequence number table 205) corresponding to a transmission bandwidth of 1 or 2 RBs (less than 3 RBs). Terminal 100 (base station 200) stores, beforehand, ZC sequence number table 105 (ZC sequence number table 205) generated, for example, through processing shown in FIG. 14.

In FIG. 14, the same processes as the those in generation example 1 (FIG. 12) will be assigned the same reference numerals and description thereof will be omitted.

In FIG. 14, in ST201, the table generating section sets 0 as an initial value of sequence group number u as in the case of ST102, and in addition, the table generating section sets an exclusion sequence number to an empty set.

In ST202, the table generating section measures an absolute value of the difference between q/N and $q_b/N_b$ as in the case of ST105, determines whether variable min is greater than the measured absolute value or not, and in addition determines whether q is included in the exclusion sequence number or not. When variable min is greater than the above-described absolute value and q is not included in the exclusion sequence number (ST202: YES), the table generating section moves to processing in ST106. On the other hand, when variable min is equal to or less than the above-described absolute value or when q is included in the exclusion sequence number (ST202: NO), the table generating section moves to processing in ST107.

In ST203, the table generating section counts the number of times ZC sequence number q' obtained through the processes in ST202 and ST106 to ST108 is used.

In ST204, the table generating section determines whether sequence number q'_pre set in the previous sequence group number (that is, u−1) is equal to sequence number q' of current group number u or not. When q'_pre is not equal to q' (ST204:YES), the table generating section moves to processing in ST208 and when q'_pre is equal to q' (ST204: NO), the table generating section moves to processing in ST205.

In ST205, the table generating section determines whether or not the number of times sequence number q' is used is equal to or greater than the value obtained by dividing the number of sequence groups by (ZC sequence length N−1) and rounding the resultant value to a nearest integer greater than the value after the division. When the number of times sequence number q' is used is equal to or greater than the above-described value (ST205: YES), the table generating section moves to processing in ST206 and when the number of times sequence number q' is used is less than the above-described value (ST205: NO), the table generating section moves to processing in ST207.

In ST206, the table generating section adds ZC sequence number q' to the exclusion sequence number list.

In ST207, the table generating section assigns the value finally saved in variable q' in sequence group number u to a sequence number of sequence group number u as in ST109, and sets q' in q'_pre, additionally.

On the other hand, in ST208, the table generating section determines whether or not the number of times sequence number q'_pre is used is less than the value obtained by dividing the number of sequence groups by (ZC sequence length N−1) and rounding the resultant value to a nearest integer smaller than the value after the division. When the number of times sequence number q'_pre is used is less than the above-described value (ST208:YES), the table generating section moves to processing in ST209 and when the number of times sequence number q'_pre is used is equal to or greater than the above-described value (ST208: NO), the table generating section moves to processing in ST207.

In ST209, the table generating section assigns ZC sequence number q'_pre to sequence group number u and moves to processing in ST110.

By carrying out the processing shown in FIG. 14 on 1 and 2 RBs, ZC sequence number table 105 (ZC sequence number table 205), is generated.

FIG. 15 illustrates an example of ZC sequence number table 105 (ZC sequence number table 205) generated through the above-described processing. In the transmission bandwidth of 1 RB (N=11) and 2 RBs (N=23) shown in FIG. 15, like generation example 1 (FIG. 13), sequence number q is assigned which corresponds to the minimum absolute value of the difference between q/N and $q_b/N_b$ corresponding to the transmission bandwidth of 3 RBs in sequence group number u=0 to 29.

In FIG. 15, the difference in the number of times each ZC sequence number is used is within 1 in each transmission bandwidth of 1 or 2 RBs. In other words, the difference in the number of groups in which each sequence number is used among ZC sequences of different sequence numbers in transmission bandwidths of 1 and 2 RBs (less than 3 RBs) is within 1.

For example, in the transmission bandwidth of 1 RB shown in FIG. 15, sequence number q=1 to 10 is used among each of three sequence groups. That is, in FIG. 15, when the transmission bandwidth is 1 RB, the difference in the number of times each ZC sequence number is used in each sequence group among different ZC sequence numbers is 0.

In the transmission bandwidth of 2 RBs shown in FIG. 15, sequence number q=1, 4, 7, 9, 13, 16, 19 is used in two sequence groups and sequence number q=2, 3, 5, 6, 8, 10, 11, 12, 14, 15, 17, 18, 20 to 23 is used in one sequence group. That is, in FIG. 15, when the transmission bandwidth is 2 RBs, the difference in the number of times each ZC sequence number is used in each sequence group among different ZC sequence numbers is 1.

As shown in the processes in ST205 and 206 shown in FIG. 14, the number of times sequences of the same sequence number are used is limited to a value rounded to a nearest integer greater than the value of ((number of sequence groups)/ZC sequence length N). In FIG. 15, the maximum number of times sequences of the same sequence number are used is "3" when the transmission bandwidth is 1 RB and "2" when the transmission bandwidth is 2 RBs. As shown in the processes in ST207 to 209 in FIG. 14, the number of times sequences of the same sequence number are used is a value rounded to a nearest integer smaller than at least the value of ((number of sequence groups)/ZC sequence length N). In FIG. 15, the minimum number of times sequences of the same sequence number are used is "2" when the transmission bandwidth is 1 RB and "1" when the transmission bandwidth is 2 RBs.

Here, generation example 1 (FIG. 13) is compared with generation example 2 (FIG. 15). When the transmission bandwidth shown in FIG. 13 is 1 RB, for example, sequence number q=1 is used among four sequence groups, sequence number q=2 is used among three sequence groups and sequence number q=1 is used among two sequence groups. That is, in FIG. 13, when the transmission bandwidth is 1 RB, the difference in the number of times each ZC sequence number is used is 2. On the other hand, in FIG. 15, as described above, when the transmission bandwidth is 1 RB, the difference in the number of times each ZC sequence number is used is 1.

That is, in generation example 2, compared with generation example 1, each ZC sequence number is assigned uniformly to all of the plurality of sequence groups. That is, in generation example 2, the number of times the same sequence number is repeatedly used in each sequence group can be smaller than that in generation example 1. Thus, in generation example 2, compared with generation example 1, the probability that a sequence group having the same sequence number may be used in neighboring cells can be reduced and interference between neighboring cells can be further reduced. Furthermore, in generation example 2, like generation example 1, a DM-RS having a transmission bandwidth of 1 RB (or 2 RBs) can be made orthogonal to a DM-RS having a transmission bandwidth of 3 or more RBs.

GENERATION EXAMPLE 3

In generation example 3, when assigning a ZC sequence number for 1 or 2 RBs of a UL CoMP terminal (terminal to which a UE-specific sequence is assigned), the transmission bandwidth corresponding to the value of $q_b/N_b$ which serves as a reference for the value of q/N which is a ratio of sequence number q and sequence length N of a ZC sequence for 1 or 2 RBs can be made to vary between 1 RB and 2 RBs.

More specifically, as the transmission bandwidth corresponding to the value of $q_b/N_b$ which serves as a reference for each transmission bandwidth of 1 or 2 RBs, a transmission bandwidth adjacent to each transmission bandwidth (1 RB and 2 RBs) (transmission bandwidth whose value is close) is used. That is, reference sequence length $N_b$ for a transmission bandwidth of 1 or 2 RBs (less than 3 RBs) and reference sequence number $q_b$ of sequence number u are a sequence length corresponding to a transmission bandwidth adjacent to the transmission bandwidth and the sequence number of group number u in an adjacent transmission bandwidth.

For example, in the following description, when determining a ZC sequence number having a transmission bandwidth of 1 RB, 2 RBs adjacent to 1 RB is used as a transmission bandwidth corresponding to the value of $q_b/N_b$ which serves as a reference. On the other hand, when determining a ZC sequence number having a transmission bandwidth of 2 RBs, 3 RBs adjacent to 2 RBs is used as a transmission bandwidth corresponding to the value of $q_b/N_b$ which serves as a reference.

The processing of generating a ZC sequence number table (105 shown in FIG. 9, 205 shown in FIG. 11) corresponding to a transmission bandwidth of 1 or 2 RBs (less than 3 RBs) in generation example 3 is substantially the same as the processing in generation example 1 (FIG. 14). However, when deriving a ZC sequence number for 1 RB, sequence length $N_b$ and sequence number $q_b$ of 2 RBs are set in ST103 shown in FIG. 14. On the other hand, when deriving a ZC sequence number for 2 RBs, sequence length $N_b$ and sequence number $q_b$ of 3 RBs are set in ST103 shown in FIG. 14.

FIG. 16 illustrates an example of ZC sequence number table 105 (ZC sequence number table 205) in generation example 3.

For example, in a transmission bandwidth of 1 RB (N=11) shown in FIG. 16, the transmission bandwidth of 2 RBs is used as a reference. That is, in the transmission bandwidth of 1 RB shown in FIG. 16, $q_b$ is one of 1 to 23 and $N_b$ is 23 with sequence group number u=0 to 29. In the transmission bandwidth of 1 RB shown in FIG. 16, sequence number q is assigned which corresponds to a minimum absolute value of the difference between q/N and $q_b/N_b$, with sequence group number u=0 to 29.

In the transmission bandwidth of 2 RBs (N=23) shown in FIG. 16, the transmission bandwidth of 3 RBs is used as a reference. That is, in the transmission bandwidth of 2 RBs shown in FIG. 16, $q_b$ takes a value of 1 to 30 and $N_b$ is 31 with sequence group number u=0 to 29. In the transmission bandwidth of 2 RBs shown in FIG. 16, sequence number q is assigned which corresponds to a minimum absolute value of the difference between q/N and $q_b/N_b$ with sequence group number u=0 to 29.

The relationship between sequence numbers in transmission bandwidths of 1, 2 and 3 RBs in ZC sequence number table 105 (ZC sequence number table 205) shown in FIG. 16 is defined as following equation 6.

[6]

$$q_{3RB} = \lfloor \bar{q}_{3RB} + 1/2 \rfloor + v \cdot (-1)^{\lfloor 2\bar{q}_{3RB} \rfloor}$$

$$\bar{q}_{3RB} = N_{ZC\_3RB}^{RS} \cdot (u+1)/31$$

$$q_{2RB} = \arg\min_k(|q_{3RB}/N_{ZC\_3RB}^{RS} - k/N_{ZC\_2RB}^{RS}|),$$
$$k=1,2\ldots,N_{ZC\_2RB}^{RS}-1$$

$$q_{1RB} = \arg\min_k(|q_{2RB}/N_{ZC\_2RB}^{RS} - k/N_{ZC\_1RB}^{RS}|),$$
$$k=1,2\ldots,N_{ZC\_1RB}^{RS}-1 \quad \text{(Equation 6)}$$

In equation 6, $q_{XRB}$ represents a sequence number of transmission bandwidth X[RB], $N_{ZC\_XRB}^{RS}$ represents a ZC sequence length of transmission bandwidth X[RB], u represents a sequence group number and v represents sequence group hopping flag (0 or 1).

Thus, by comparing absolute values of the difference between q/N and $q_b/N_b$ between neighboring transmission bandwidths, it is possible to accurately perform grouping of sequences such that their q/N values become closer to each other. Thus, for example, in terminal 100 (UL CoMP terminal) located at a cell edge, orthogonality between DM-RSs (ZC sequences) can be further improved in a band in which DM-RSs having a narrow transmission bandwidth (e.g., 1, 2 or 3 RBs) are used.

GENERATION EXAMPLE 4

In generation example 4, when assigning a ZC sequence number for 1 or 2 RBs of a UL CoMP terminal (terminal to which a UE-specific sequence is assigned), an average value of $q_{rb}/N_{rb}$ which is a ratio of ZC sequence n sequence number $q_{rb}$ and sequence length $N_{rb}$ in each of a transmission bandwidth (3 RBs to 110 RBs) of 3 or more RBs is used as a reference for the value of q/N which is a ratio of sequence number q and sequence length N of a ZC sequence for 1 or 2 RBs.

Figure 17:
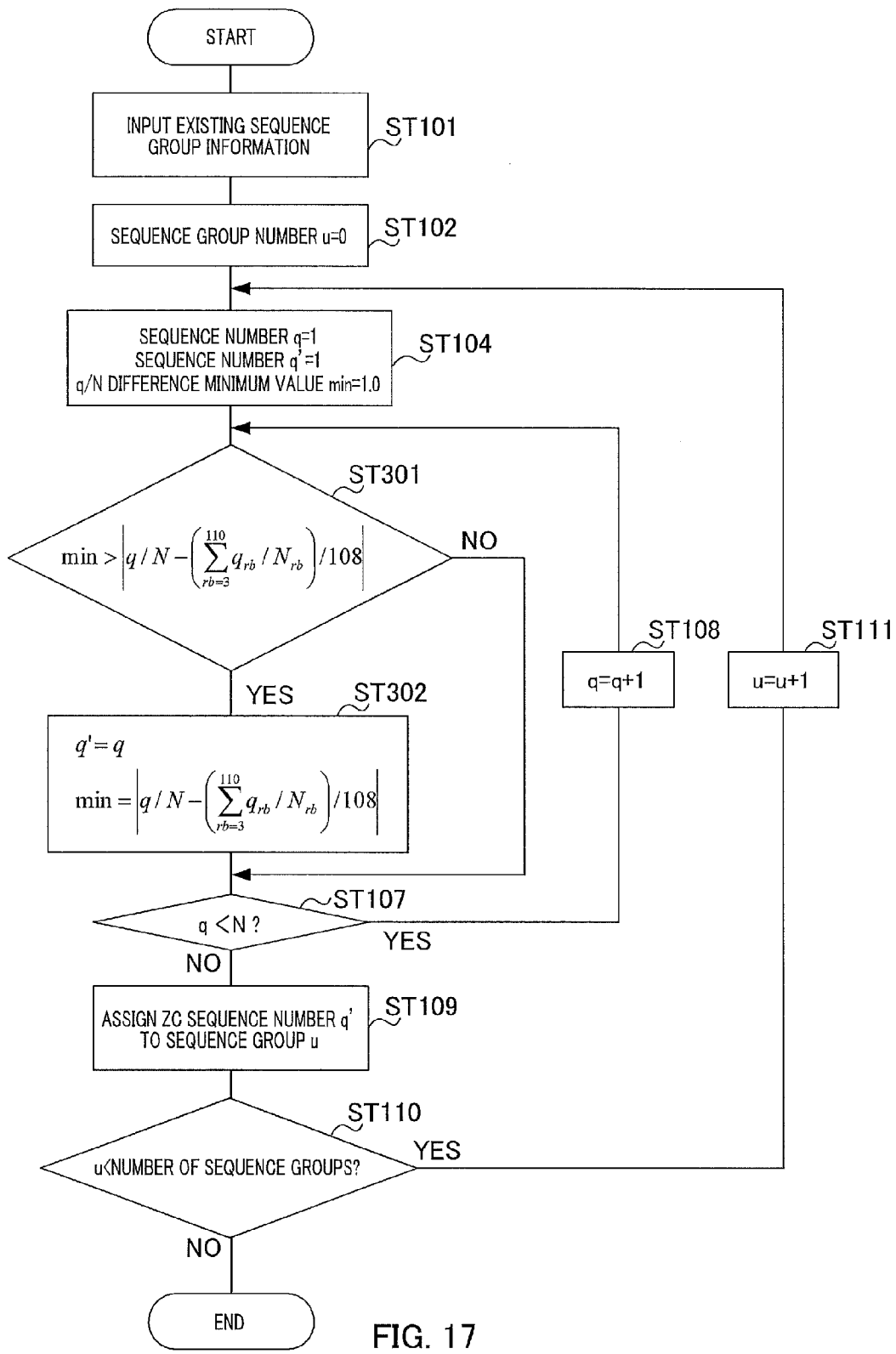
FIG. 17 is a flowchart illustrating ZC sequence number table generation processing according to Embodiment 1 of the present invention (generation example 4)

FIG. 17 is a flowchart illustrating an example of processing of generating ZC sequence number table 105 (ZC sequence number table 205) corresponding to a transmission bandwidth of 1 or 2 RBs (less than 3 RBs) Terminal 100 (base station 200) stores, beforehand, ZC sequence number table 105 (ZC sequence number table 205) generated through, for example, the processing shown in FIG. 17.

In FIG. 17, processes identical to the processes in generation example 1 (FIG. 12) will be assigned the same reference numerals and description thereof will be omitted. More specifically, in FIG. 17, the processing in ST103 shown in FIG. 12 is not performed and processes in ST301 and ST302 are performed instead of the processes in ST105 and ST106.

In FIG. 17, in ST301, the table generating section calculates an average value of $q_{rb}/N_{rb}$ of 108 types of transmission bandwidths (3 RBs to 110 RBs), measures an absolute value of the difference between q/N and the above-described average value and determines whether variable min is greater than the measured absolute value or not. The table generating section moves to processing in ST302 when variable min is greater than the above-described absolute value (ST301: YES), and moves to processing in ST107 when variable min is equal to or below the above-described absolute value (ST301: NO).

In ST302, the table generating section sets q' in q and sets min in the absolute value of the difference between q/N and above-described average value in the current value of q.

FIG. 18 illustrates an example of ZC sequence number table 105 (ZC sequence number table 205) generated through the processing shown in FIG. 17. That is, in FIG. 18, an average value of $q_{rb}/N_{rb}$ in each of 108 types of transmission bandwidths (3 RBs to 110 RBs) serves as a reference for a transmission bandwidth of 1 or 2 RBs. That is, in transmission bandwidths of 1 RB (N=11) and 2 RBs (N=23) shown in FIG. 18, sequence number q is assigned which corresponds to a minimum absolute value of the difference between the above-described average value of $q_b/N_b$ which is a reference and q/N with sequence group number u=0 to 29.

The relationship between sequence numbers in transmission bandwidths of 1, 2 and 3 RBs in ZC sequence number table 105 (ZC sequence number table 205) shown in FIG. 18 is defined as following equation 7.

[7]

$$q_{qRB} = \lfloor \bar{q}_{pRB} + 1/2 \rfloor + v \cdot (-1)^{\lfloor 2q_{pRB} \rfloor}, \quad \text{(Equation 7)}$$
$$p = 3, 4, \ldots, 110$$
$$\bar{q}_{pRB} = N_{ZC\_pRB}^{RS} \cdot (u+1)/31$$
$$ave = \frac{1}{108} * \sum_{p=3}^{110} (q_{pRB} / N_{ZC\_pRB}^{RS})$$
$$q_{2RB} = \operatorname{argmin}_k (|ave - k/N_{ZC\_2RB}^{RS}|),$$
$$k = 1, 2, \ldots, N_{ZC\_2RB}^{RS} - 1$$
$$q_{1RB} = \operatorname{argmin}_k (|ave - k/N_{ZC\_1RB}^{RS}|),$$
$$k = 1, 2, \ldots, N_{ZC\_1RB}^{RS} - 1$$

In equation 7, $q_{XRB}$ represents a sequence number of transmission bandwidth X[RB], $N_{ZC\_XRB}^{RS}$ represents a ZC sequence length of transmission bandwidth X[RB], u represents a sequence group number, v represents a sequence hopping flag (0 or 1) and ave represents an average value of $q_{rb}/N_{rb}$ in each of 108 types of transmission bandwidths (3 RBs to 110 RBs).

By so doing, in a transmission bandwidth of 1 or 2 RBs, a ZC sequence to which all transmission bandwidths of 3 or more RBs are assigned as a reference can be used. Thus, according to generation example 4, like generation example 1, DM-RSs (ZC sequences) can be orthogonalized irrespective of the transmission bandwidth of the DM-RSs among terminals 100 having an identical UE-specific sequence, and it is thereby possible to improve channel estimation accuracy and increase the multiplex number in MU-MIMO communication.

Note that two ZC sequences (ZC sequences used in two slots respectively) may be assigned to each sequence group in a transmission bandwidth of 3 or more RBs (e.g., 6 or more RBs). Therefore, when calculating an average value of $q_{rb}/N_{rb}$ in each transmission bandwidth of 3 or more RBs (3 RBs to 110 RBs), one of two ZC sequences (two slots) may be used in each sequence group. More specifically, when an average value of $q_{rb}/N_{rb}$ at each transmission bandwidth of 3 or more RBs (3 RBs to 110 RBs) is calculated, v=0 or 1 shown in equation 7 may be used.

In uplink (UL), a transmission bandwidth that includes any number other than 2, 3 and 5 as prime factors of transmission bandwidth (number of RBs) is not used. Thus, when calculating an average value of $q_{rb}/N_{rb}$ in each transmission bandwidth of 3 or more RBs (3 RBs to 110 RBs), the value of $q_{rb}/N_{rb}$ in a transmission bandwidth which is not used on uplink among transmission bandwidths of 3 or more RBs may be excluded. This makes it possible to accurately set a sequence number of a ZC sequence used for DM-RSs on uplink.

Generation examples 1 to 4 for generating ZC sequence number table 105 (ZC sequence number table 205) used in terminal 100 (FIG. 9) and base station 200 (FIG. 11) have been described so far.

Thus, when CoMP by a plurality of base stations 200 (cells) is applied, sequence generating section 103 in terminal 100 generates a DM-RS in a transmission bandwidth less than a predetermined number (3 RBs) using a ZC sequence used for a DM-RS in a transmission bandwidth equal to or greater than the predetermined number, and when CoMP is not applied, sequence generating section 103 generates a DM-RS sequence in a transmission bandwidth less than the predetermined number using a CG sequence which is different from the ZC sequence. The DM-RS generated is transmitted via transmitting section 112.

That is, when transmitting a DM-RS for 1 or 2 RBs, terminal 100 switches a code sequence used for a DM-RS using a ZC sequence when CoMP is applied and using a CG sequence when CoMP is not applied. In this case, for a ZC sequence used for a DM-RS for 1 or 2 RBs, as in the case of a ZC sequence used in a transmission bandwidth of 3 or more RBs, a ZC sequence number having a small q/N difference is assigned to each sequence group. By so doing, for example, by applying a cyclic shift corresponding to a transmission band to a ZC sequence (e.g., see NPL 2), it is possible to orthogonalize a DM-RS having a transmission bandwidth of 1 or 2 RBs and a DM-RS having a transmission bandwidth of 3 or more RBs. Thus, according to the present embodiment, it is possible to improve channel estimation accuracy and increase the multiplex number in MU-MIMO communication.

(Embodiment 2)

In Embodiment 1, when setting a ZC sequence having transmission bandwidth 1 or 2, as in the case of a ZC sequence for a DM-RS of 3 or more RBs, the sequence length of the ZC sequence is assumed to be a maximum prime number within the number of subcarriers corresponding to the transmission bandwidth (number of RBs). Therefore, a sequence is used in which the leading portion of a ZC sequence smaller than the size of a DM-RS is copied (extended) to the rear end portion (e.g., see FIG. 19A).

Figure 19:
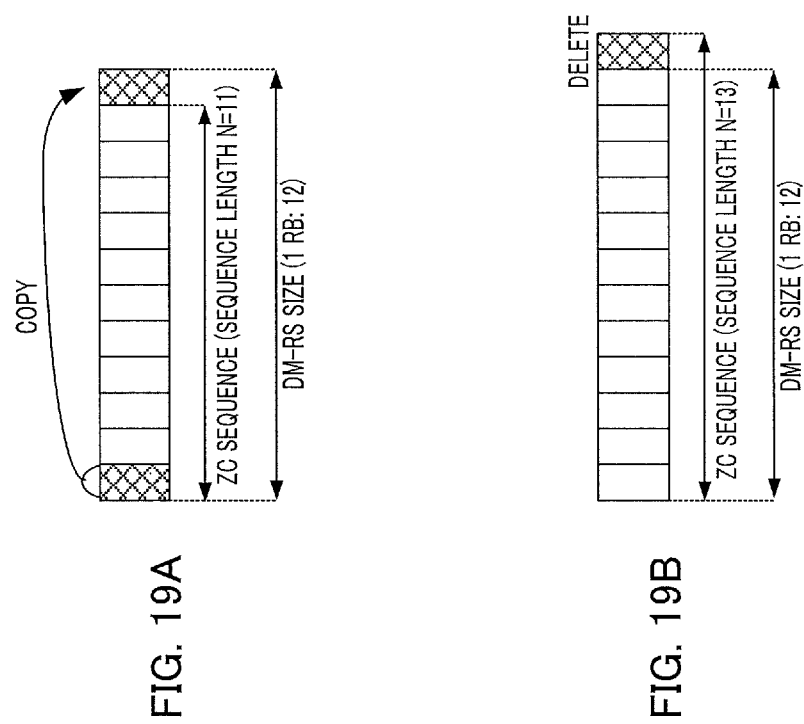
FIGS. 19A and 19B illustrate extension processing and truncation processing on a ZC sequence.

In contrast, the present embodiment will describe a case where a sequence resulting from deleting (truncating) the rear end portion of a ZC sequence greater than the size of a DM-RS is used when a ZC sequence having a transmission bandwidth of 1 or 2 is set (e.g., see FIG. 19B). That is, in the present embodiment, the sequence length of a ZC sequence is assumed to be a minimum prime number which is greater than the number of subcarriers corresponding to a transmission bandwidth (number of RBs).

Note that a base station and a terminal according to the present embodiment have basic configurations common to those of base station 100 and terminal 200 according to Embodiment 1, and therefore the basic configurations thereof in this embodiment will be described using FIGS. 9 and 11.

For example, in Embodiment 1, a ZC sequence having sequence length N=11 is used in a transmission bandwidth of 1 RB (12 subcarriers) as shown in FIG. 19A. In contrast, in the present embodiment, a ZC sequence having sequence length 13 is used in a transmission bandwidth of 1 RB (12 subcarriers) as shown in FIG. 19B. In FIG. 19B, sequence generating section 103 (sequence generating section 203) deletes the rear end portion (corresponding to 1 subcarrier) of the ZC sequence obtained having sequence length N=13 to obtain a DM-RS sequence.

Similarly, in Embodiment 1, a ZC sequence of sequence length N=23 is used in a transmission bandwidth of 2 RBs (24 subcarriers). In contrast, in the present embodiment, a ZC sequence of sequence length 29 is used (not shown) in a transmission bandwidth of 2 RBs (24 subcarriers). Sequence generating section 103 deletes the rear end portion (corresponding to 5 subcarriers) of the obtained ZC sequence of sequence length N=29 to obtain a DM-RS sequence.

FIG. 20 illustrates an example of ZC sequence number table 105 (ZC sequence number table 205) obtained when processing similar to that of generation example 1 (e.g., FIG. 14) of Embodiment 1 (FIG. 13) is applied in the present embodiment.

Similarly, FIG. 21 illustrates an example of ZC sequence number table 105 (ZC sequence number table 205) obtained when processing similar to that of generation example 3 (FIG. 16) of Embodiment 1 is applied in the present embodiment.

Similarly, FIG. 22 illustrates an example of ZC sequence number table 105 (ZC sequence number table 205) obtained when processing similar to that of generation example 4 (FIG. 18) of Embodiment 1 (e.g., FIG. 17) is applied in the present embodiment.

By so doing, more ZC sequences can be secured in transmission bandwidths of 1 and 2 RBs in the present embodiment compared to Embodiment 1. More specifically, while 10 ZC sequences are obtained in a transmission bandwidth of 1 RB in Embodiment 1 (sequence length N=11), 12 ZC sequences are obtained in the present embodiment (sequence length N=13). In addition, while 22 ZC sequences are obtained in a transmission bandwidth of 2 RBs in Embodiment 1 (sequence length N=23), 28 ZC sequences are obtained in the present embodiment (sequence length N=29).

Thus, according to the present embodiment, more ZC sequences can be used in transmission bandwidths of 1 and 2 RBs, and it is possible to prevent a decrease in the number of reuse factors and to suppress inter-cell interference.

According to the present embodiment, like Embodiment 1, by applying a cyclic shift to a ZC sequence in accordance with a transmission band (e.g., see NPL 2), it is possible to orthogonalize a DM-RS in a transmission bandwidth of 1 or 2 RBs and a DM-RS in a transmission bandwidth of 3 or more RBs by CS, and thereby improve channel estimation accuracy and increase the multiplex number in MU-MIMO communication.

When a DM-RS is generated by deleting (truncating) a ZC sequence, CM (cubic metric or PAPR (peak to average power ratio)) may increase. However, when CoMP is applied in a HetNet environment, sufficient performance can be obtained despite low transmission power of the terminal, and power limitation rarely occurs. Thus, in the present embodiment, an increase in CM by deleting (truncating) a ZC sequence poses no problem.

<Embodiment 3>

In the present embodiment, sequence group hopping for a terminal to which CoMP is applied is made different from sequence group hopping for a terminal to which CoMP is not applied.

Figure 23:
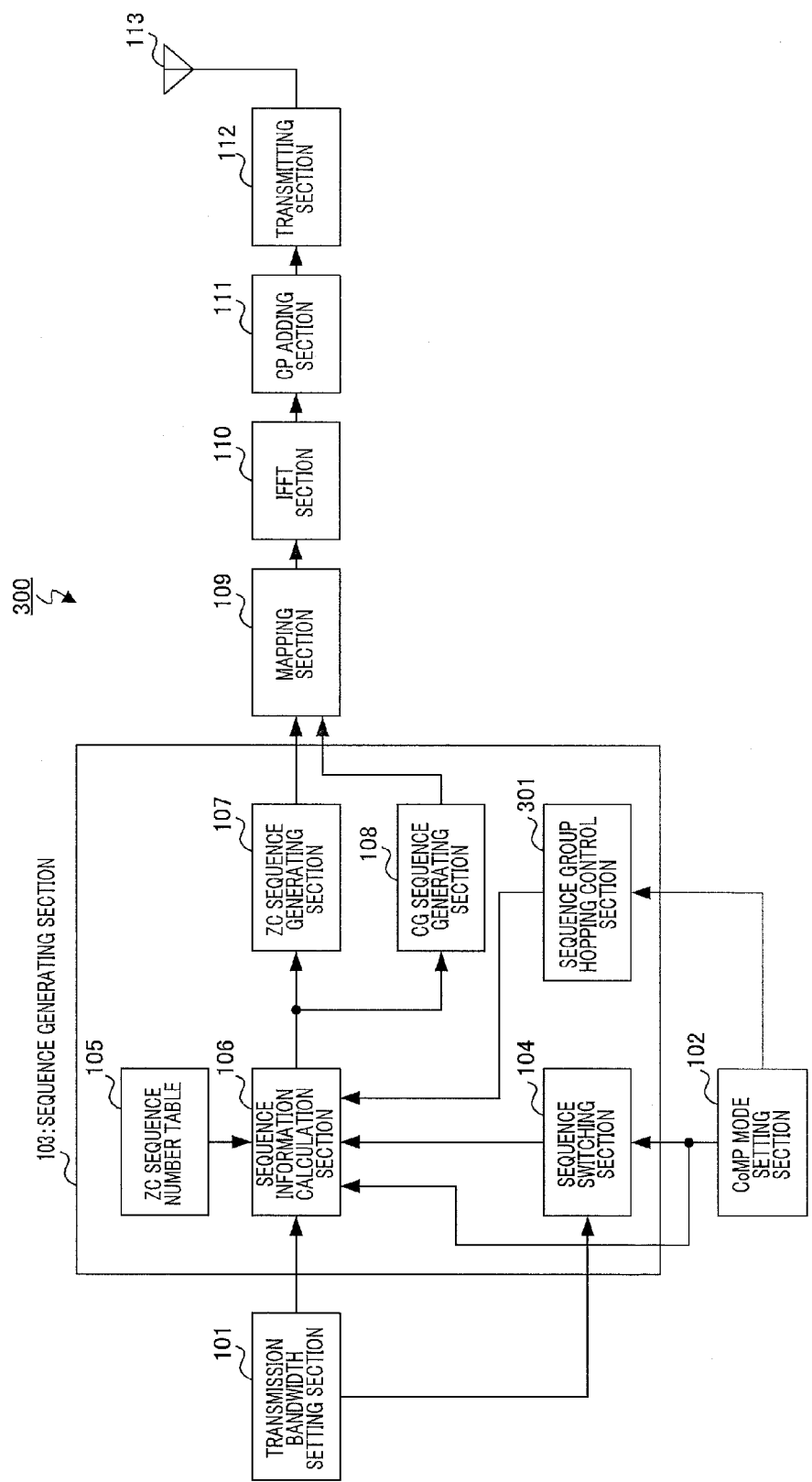
FIG. 23 is a block diagram illustrating a configuration of a terminal according to Embodiment 3 of the present invention.
Figure 25:
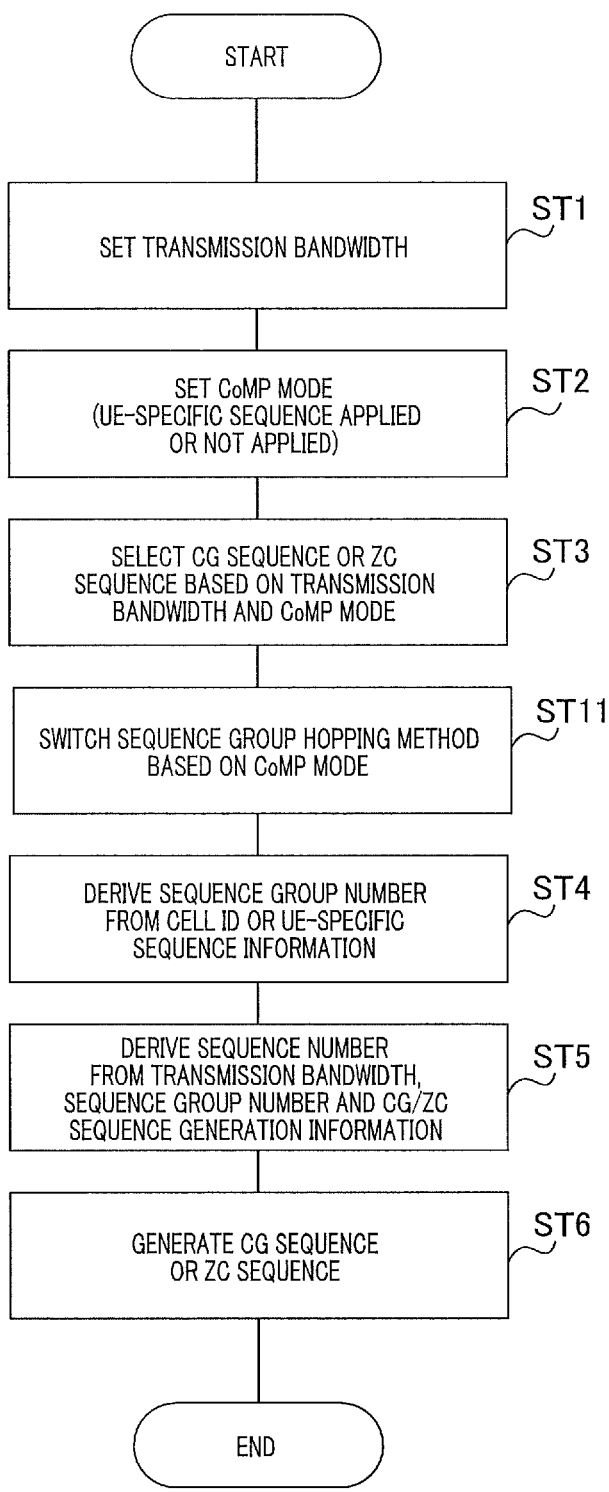
FIG. 25 is a flowchart illustrating DM-RS sequence generation processing in the terminal according to Embodiment 3 of the present invention.

FIG. 23 is a block diagram illustrating a configuration of terminal 300 according to the present embodiment. In FIG. 23, components identical to those in Embodiment 1 (FIG. 9) will be assigned identical reference numerals and description thereof will be omitted. FIG. 25 is a flowchart illustrating processing of generating a DM-RS sequence in terminal 100. In FIG. 25, processes identical to those in Embodiment 1 (FIG. 10) will be assigned identical reference numerals and description thereof will be omitted.

In terminal 300, sequence group hopping control section 301 receives information indicating application or no application of CoMP of terminal 300 from CoMP mode setting section 102. When CoMP is not applied (UE-specific sequence not applied), sequence group hopping control section 301 outputs, for example, a conventionally used existing sequence group hopping pattern to sequence information calculation section 106. On the other hand, when CoMP is applied (UE-specific sequence applied), sequence group hopping control section 301 outputs a sequence group hopping pattern which is different from a sequence group hopping pattern to be used when CoMP is not applied to sequence information calculation section 106.

That is, sequence group hopping control section 301, switches a sequence group hopping pattern according to application or no application of CoMP (ST11 shown in FIG. 25). The sequence group hopping pattern used when CoMP is applied is individually indicated to terminal 300. The above-described existing sequence group hopping pattern is a sequence group hopping pattern used when the transmission bandwidth is 3 or more RBs.

Sequence information calculation section 106 derives a sequence group number based on the sequence group hopping pattern inputted from sequence group hopping control section 301 in addition to the transmission bandwidth and application or no application of the CoMP mode.

Figure 24:
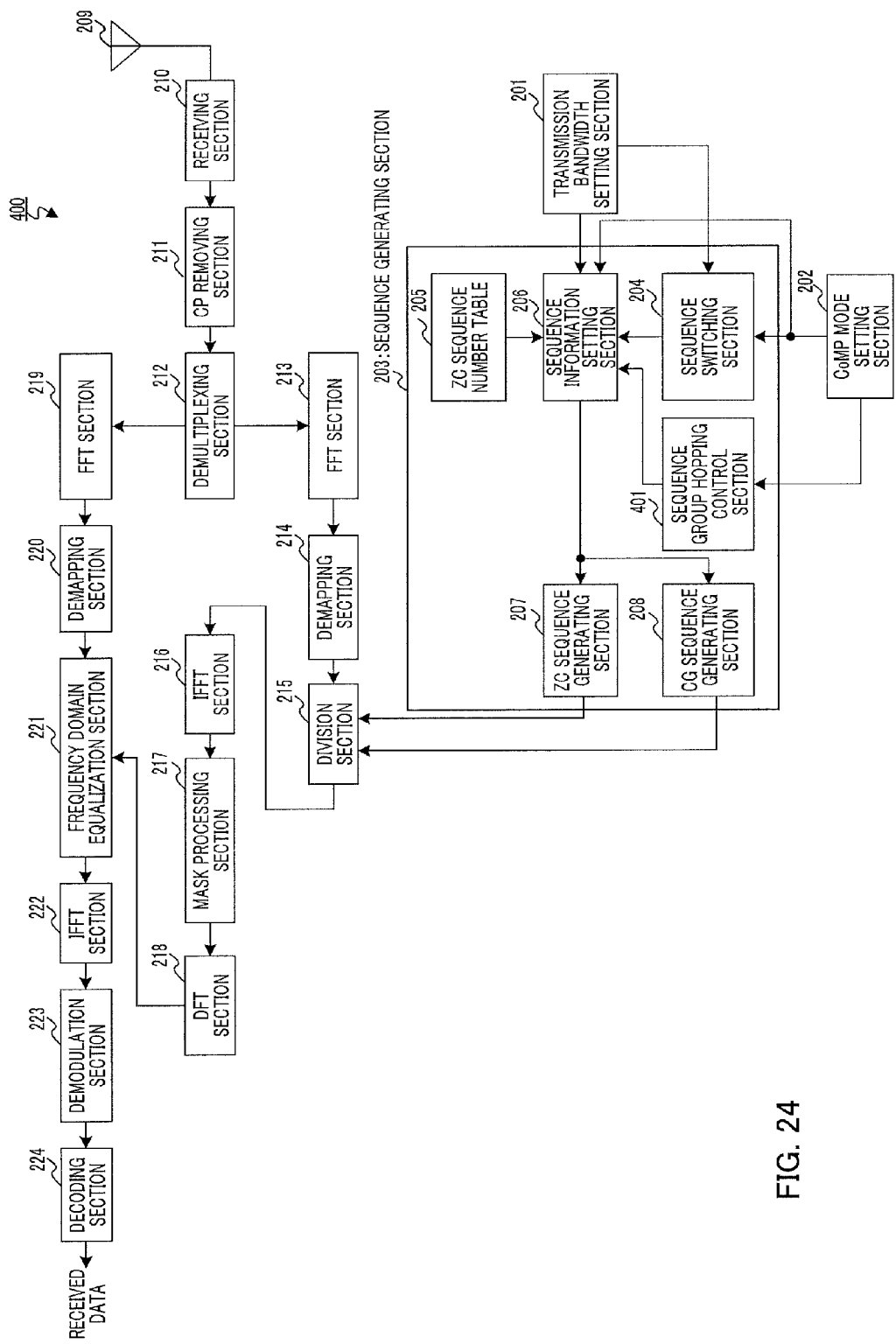
FIG. 24 is a block diagram illustrating a configuration of a base station according to Embodiment 3 of the present invention.

FIG. 24 is a block diagram illustrating a configuration of base station 400 according to the present embodiment. In FIG. 24, components identical to those in Embodiment 1 (FIG. 11) will be assigned identical reference numerals and description thereof will be omitted.

In base station 400, sequence group hopping control section 401 receives information indicating application or no application of CoMP of terminal 300 from CoMP mode setting section 202. When CoMP is not applied to terminal 300 (no UE-specific sequence is applied), sequence group hopping control section 401 outputs, for example, the above-described existing sequence group hopping pattern to sequence information calculation section 206. On the other hand, when CoMP is applied to terminal 300 (UE-specific sequence is applied), sequence group hopping control section 401 outputs a sequence group hopping pattern different from the sequence group hopping pattern used when CoMP is not applied to sequence information calculation section 206. That is, like sequence group hopping control section 301, sequence group hopping control section 401 switches a sequence group hopping pattern according to application or no application of CoMP.

Sequence information calculation section 206 derives a sequence group number based on the sequence group hopping pattern inputted from sequence group hopping control section 401 in addition to transmission bandwidth and application or no application of the CoMP mode.

As described in Embodiment 1, when a ZC sequence is used in a transmission bandwidth of 1 or 2 RBs, the same sequence number is used in a plurality of sequence groups (e.g., see FIG. 13, FIG. 15, FIG. 16 and FIG. 18). For this reason, if the sequence group hopping pattern (existing sequence group hopping pattern) used when CoMP is not applied in a ZC sequence in a transmission bandwidth of 1 or 2 RBs is used, there is a possibility that the same sequence number may have been assigned to the hopping source and the hopping destination of the sequence group. In this case, the hopping effects of the sequence group cannot be achieved. Thus, the hopping effects of the sequence group may be reduced in the ZC sequence in a transmission bandwidth of 1 or 2 RBs.

In contrast, when the CoMP mode is applied, terminal 300 (base station 400) uses a sequence group hopping pattern different from the sequence group hopping pattern used when the CoMP mode is not applied irrespective of the number of RBs (transmission bandwidth). This prevents the hopping effects of the sequence group from deteriorating.

The embodiments of the present invention have been described so far.

In the above-described embodiments, use or no use of a ZC sequence having a transmission bandwidth of 1 or 2 RBs may be set by RRC (radio resource control) in addition to the setting of application or no application of a UE-specific sequence.

In addition, in the above-described embodiments, when terminal (UE)-specific CS (cyclic shift) hopping is applied, CS hopping may be applied to a ZC sequence for transmission bandwidths of 1 or 2 RBs.

While a CoMP mode is applied to an uplink data channel (PUSCH: physical uplink shared channel), the CoMP mode may not be applied to an uplink control channel (PUCCH: physical uplink control channel). Thus, in the above-described embodiments, a CG sequence may be adopted for a DM-RS (transmission bandwidth of 1 or 2 RBs) transmitted by a PUCCH to which the CoMP mode is not applied and a ZC sequence may be adopted for a DM-RS (transmission bandwidth of 1 or 2 RBs) transmitted by a PUSCH to which the CoMP mode is applied.

The embodiments have been described with an antenna but the present invention can be applied to an antenna port as well.

The term "antenna port" refers to a logical antenna including one or more physical antennas. In other words, the term "antenna port" does not necessarily refer to a single physical antenna, and may sometimes refer to an array antenna including a plurality of antennas, for example.

For example, in LTE, how many physical antennas are included in the antenna port is not defined, but the antenna port is defined as the minimum unit allowing the base station to transmit different reference signals.

In addition, an antenna port may be specified as a minimum unit to be multiplied by a precoding vector weighting.

In the embodiments described above, the present invention is configured with hardware by way of example, but the invention may also be provided by software in concert with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology, for example.

A transmitting apparatus according to this disclosure includes: a generating section that generates, when coordinated reception at a plurality of receiving apparatuses is applied, a reference signal having a transmission bandwidth less than a predetermined number using a first sequence used for a reference signal having a transmission bandwidth equal to or greater than the predetermined number, and that generates, when the coordinated reception is not applied, the reference signal having a transmission bandwidth less than the predetermined number using a second sequence different from the first sequence; and a transmitting section that transmits the reference signal.

In the transmitting apparatus according to this disclosure: when a reference sequence length is represented by "$N_b$" and a reference sequence number of group number "u" is represented by "$q_b$," the first sequence of a sequence number "q" corresponding to a lowest absolute value of a difference between $q_b/N_b$ and q/N for sequence length N corresponding to each of a plurality of transmission bandwidths is grouped as a group of group number u; and the generating section generates, when the coordinated reception is applied, the reference signal using any one of the grouped first sequences.

In the transmitting apparatus according to this disclosure, the reference sequence length $N_b$ and the reference sequence number $q_b$ corresponding to the transmission bandwidth less than the predetermined number are identical to a reference sequence length and a reference sequence number corresponding to a transmission bandwidth equal to or greater than the predetermined number.

In the transmitting apparatus according to this disclosure, in the transmission bandwidth less than the predetermined number, a difference in a number of groups in which each sequence number is used between the first sequences of different sequence numbers is within one.

In the transmitting apparatus, the reference sequence length $N_b$ and the reference sequence number $q_b$ corresponding to the transmission bandwidth less than the predetermined number are a sequence length corresponding to a transmission bandwidth adjacent to the transmission bandwidth and a sequence number of the group number u in the adjacent transmission bandwidth.

In the transmitting apparatus according to this disclosure: when a sequence length corresponding to each transmission bandwidth equal to or greater than the predetermined number is represented by "$N_{rb}$," and a sequence number of group number "u" is represented by "$q_{rb}$," the first sequence of a sequence number "q" is grouped as a group of a group number u, the first sequence of the sequence number q corresponding to a lowest absolute value of a difference between an average value of $q_{rb}/N_{rb}$ in each transmission bandwidth equal to or greater than the predetermined number, and q/N for the sequence length N corresponding to each transmission bandwidth less than the predetermined number; and the generating section generates the reference signal using any one of the grouped first sequences when the coordinated reception is applied.

In the transmitting apparatus according this disclosure, when the coordinated reception is applied and the transmission bandwidth is less than the predetermined number, the generating section deletes part of the first sequence of a sequence length in accordance with the transmission bandwidth to thereby generate the reference signal of the transmission bandwidth.

In the transmitting apparatus according to this disclosure, when the coordinated reception is applied, the generating section generates the reference signal using a sequence group hopping pattern different from a sequence group hopping pattern used when the coordinated reception is not applied.

In the transmitting apparatus according to this disclosure, the first sequence is a Zadoff-Chu sequence and the second sequence is a computer generated sequence.

In the transmitting apparatus according to this disclosure, the reference signal is a reference signal for data demodulation (demodulated reference signal).

A transmission method according to this disclosure includes: generating, when coordinated reception at a plurality of receiving apparatuses is applied, a reference signal having a transmission bandwidth less than a predetermined number using a first sequence used for a reference signal having a transmission bandwidth equal to or greater than the predetermined number, and generating, when the coordinated reception is not applied, a reference signal having a transmission bandwidth less than the predetermined number using a second sequence different from the first sequence; and transmitting the reference signal.

The disclosure of the specification, the drawings, and the abstract included in Japanese Patent Application No. 2012-015617 filed on Jan. 27, 2012 is incorporated herein by reference in their entirety.

INDUSTRIAL APPLICABILITY

The present invention can be applied to mobile communication systems, for example.

REFERENCE SIGNS LIST 100, 300 Terminal
200, 400 Base station
101, 201 Transmission bandwidth setting section
102, 202 CoMP mode setting section
103, 203 Sequence generating section
104, 204 Sequence switching section
105, 205 ZC sequence number table
106, 206 Sequence information calculation section
107, 207 ZC sequence generating section
108, 208 CG sequence generating section
109 Mapping section
110, 216, 222 IFFT section
111 CP Adding section
112 Transmitting section
113, 209 Antenna
210 Receiving section
211 CP removing section
212 Demultiplexing section
213, 219 FFT section
214, 220 Demapping section
215 Division section
217 Mask processing section
218 DFT section
221 Frequency domain equalization section
223 Demodulation section
224 Decoding section
301, 401 Sequence group hopping control section

The invention claimed is:

1. A transmitting apparatus comprising:
a generating section that generates, when coordinated reception at a plurality of receiving apparatuses is applied, a reference signal having a transmission bandwidth less than a predetermined number using a first sequence used for a reference signal having a transmission bandwidth equal to or greater than the predetermined number, and that generates, when the coordinated reception is not applied, the reference signal having a transmission bandwidth less than the predetermined number using a second sequence different from the first sequence; and
a transmitting section that transmits the reference signal,
wherein when a reference sequence length is represented by "Nb" and a reference sequence number of group number "u" is represented by "qb," the first sequence of a sequence number "q" corresponding to a lowest absolute value of a difference between qb/Nb and q/N for sequence length N corresponding to each of a plurality of transmission bandwidths is grouped as a group of group number u; and
the generating section generates. when the coordinated reception is applied, the reference signal using any one of the grouped first sequences.

2. The transmitting apparatus according to claim 1, wherein the reference sequence length Nb and the reference sequence number qb corresponding to the transmission bandwidth less than the predetermined number are identical to a reference sequence length and a reference sequence number corresponding to a transmission bandwidth equal to or greater than the predetermined number.

3. The transmitting apparatus according to claim 1, wherein, in the transmission bandwidth less than the predetermined number, a difference in a number of groups in which each sequence number is used between the first sequences of different sequence numbers is within one.

4. The transmitting apparatus according to claim 1, wherein the reference sequence length Nb and the reference sequence number qb corresponding to the transmission bandwidth less than the predetermined number are a sequence length corresponding to a transmission bandwidth adjacent to the transmission bandwidth and a sequence number of the group number u in the adjacent transmission bandwidth.

5. The transmitting apparatus according to claim 1, wherein, when the coordinated reception is applied and the transmission bandwidth is less than the predetermined number, the generating section deletes part of the first sequence of a sequence length in accordance with the transmission bandwidth to thereby generate the reference signal of the transmission bandwidth.

6. The transmitting apparatus according to claim 1, wherein, when the coordinated reception is applied, the generating section generates the reference signal using a sequence group hopping pattern different from a sequence group hopping pattern used when the coordinated reception is not applied.

7. The transmitting apparatus according to claim 1, wherein the first sequence is a Zadoff-Chu sequence and the second sequence is a computer generated sequence.

8. The transmitting apparatus according to claim 1, wherein the reference signal is a reference signal for data demodulation (demodulated reference signal).

9. A transmission method comprising:
generating, when coordinated reception at a plurality of receiving apparatuses is applied, a reference signal having a transmission bandwidth less than a predetermined number using a first sequence used for a reference signal having a transmission bandwidth equal to or greater than the predetermined number, and generating, when the coordinated reception is not applied, a reference signal having a transmission bandwidth less than the predetermined number using a second sequence different from the first sequence; and
transmitting the reference signal,
wherein when a reference sequence length is represented b "Nb" and a reference sequence number of group number "u" is represented by "qb," the first sequence of a sequence number "q" corresponding to a lowest absolute value of a difference between qb/Nb and q/N for sequence length N corresponding to each of a plurality of transmission bandwidths is grouped as a group of group number u; and
the generating of the reference signal is performed, when the coordinated reception is applied, by using any one of the grouped first sequences.

10. A transmitting apparatus comprising:
a generating section that generates, when coordinated reception at a plurality of receiving apparatuses is applied, a reference signal having a transmission bandwidth less than a predetermined number using a first sequence used for a reference signal having a transmission bandwidth equal to or greater than the predetermined number, and that generates, when the coordinated reception is not applied, the reference signal having a transmission bandwidth less than the predetermined number using a second sequence different from the first sequence; and a transmitting section that transmits the reference signal, wherein when a sequence length corresponding to each transmission bandwidth equal to or greater than the predetermined number is represented by "Nrb" and a sequence number of group number "u" is represented by "qrb," the first sequence of a sequence number "q" is grouped as a group of a group number u, the first sequence of the sequence number q corresponding to a lowest absolute value of a difference between an average value of qrb/Nrb in each transmission bandwidth equal to or greater than the predetermined number, and q/N for the sequence length N corresponding to each transmission bandwidth less than the predetermined number; and the generating section generates the reference signal using any one of the grouped first sequences when the coordinated reception is applied.

* * * * *